(12) United States Patent
Tai et al.

(10) Patent No.: US 8,447,135 B2
(45) Date of Patent: May 21, 2013

(54) METHODS AND SYSTEMS FOR GENERATING ENHANCED IMAGES USING EULER'S ELASTICA MODEL

(75) Inventors: Xue-Cheng Tai, Singapore (SG); Jooyoung Hahn, Singapore (SG); Jason Chung, Singapore (SG)

(73) Assignee: Nanyang Technological University, Singapore (SG)

( * ) Notice: Subject to any disclaimer, the term of this patent is extended or adjusted under 35 U.S.C. 154(b) by 76 days.

(21) Appl. No.: 13/038,731

(22) Filed: Mar. 2, 2011

(65) Prior Publication Data

US 2012/0224781 A1 Sep. 6, 2012

(51) Int. Cl.
*G06K 9/40* (2006.01)

(52) U.S. Cl.
USPC .......................................................... 382/275

(58) Field of Classification Search
USPC .................................. 382/260, 274, 275, 282
See application file for complete search history.

(56) References Cited

U.S. PATENT DOCUMENTS

| | | | | |
|---|---|---|---|---|
| 7,230,429 | B1 * | 6/2007 | Huang et al. .................. | 324/322 |
| 7,840,086 | B2 * | 11/2010 | Bertozzi et al. ............... | 382/254 |
| 2006/0274927 | A1 * | 12/2006 | Conrad-Hansen et al. ... | 382/132 |
| 2007/0160309 | A1 * | 7/2007 | Bertozzi et al. ............... | 382/266 |
| 2008/0107319 | A1 * | 5/2008 | Chang et al. .................. | 382/131 |

OTHER PUBLICATIONS

Tony F. Chan, Michael K. Ng, Andy C. Yau, Andy M. Yip, Super-resolution image reconstruction using fast inpainting algorithms, Applied and Computational Harmonic Analysis, vol. 23, Issue 1, Jul. 2007, pp. 3-24.*

Celia A. Zorzo Barcelos, Marcos Aurélio Batista, Image restoration using digital inpainting and noise removal, Image and Vision Computing, vol. 25, Issue 1, Jan. 2007, pp. 61-69.*

T. Chan, S. Kang, J. Shen, Euler's elastica and curvature-based inpainting, SIAM J. Appl. Math. 63 (2) (2002) 564-592.*

Chen et al, A Fast Algorithm for Euler'S Elastica Model Using Augmented Lagrangian Method, SIAM J. Imaging Sci., 4(1), 313-344. (32 pages).*

Esser, E., "Applications of lagrangian-based alternating direction methods and connections to split Bregman," Technical Report, UCLA CAM Report 09-31,2009.

Setzer, S., "Operator Splittings, Bregman Methods and Frame Shrinkage in Imagine Processing," Int J Comput Vis 92: (2009) pp. 265-280.

Tai, X. et al., "Augmented Lagrangian Method, Dual Methods and Split Bregman Iteration for ROF Model," Technial Report, UCLA CAM Report 09-76, 2009.

Hahn, J. et al., "Augmented Lagrangian method for generalized TV-Stokes model," Technical Report, UCLA CAM Report, 2010.

Schoenemann, T. et al., "Curvature Regularity for Region-based Image Segmentation and Inpainting: A Linear Programming Relaxation," IEEE Int. Conf. Comp. Vision, Kyoto, Japan, 2009.

El-Zehiry, N. et al, "Fast Global Optimization of Curvature," IEEE Conference on CVPR 2010, San Francisco, CA, pp. 3257-3264.

Bae, J. et al., "Graph Cuts for Curvature based Image Denoising," IEEE Trans. Image Process, 2009, pp. 1-30.

* cited by examiner

*Primary Examiner* — Andrae S Allison
(74) *Attorney, Agent, or Firm* — Fredrikson & Byron, PA

(57) ABSTRACT

A process is proposed for using a degraded first image to generate a visually pleasing second image, which is a stationary point of an Euler's Elastica energy. The Euler's Elastica problem is converted into a well-designed constrained minimization which an Augmented Lagrangian method can be applied. The invention has applications to variational image denoising, repairing image inpainting, and image zooming. Certain embodiments of the invention have been found to be fast to converge and simple to implement.

13 Claims, 19 Drawing Sheets

(e) (f)

(g) (h)

(a) (b)

(a) (b)

(a) (b)

(a) (b)

(a)          (b)

(a)          (b)

(a)

(b)

(c)

(d)

METHODS AND SYSTEMS FOR GENERATING ENHANCED IMAGES USING EULER'S ELASTICA MODEL

FIELD OF THE INVENTION

The present invention relates to computationally-efficient methods for transforming a degraded first image into an second image (a "recovered" image, which is visually pleasing), by solving an Euler's Elastica model.

BACKGROUND OF THE INVENTION

Euler's elastica is defined as planar curves γ that minimize energy functionals of the form:

$$E(\gamma) = \int_\gamma (a + b\kappa^2)\, ds \quad (1.1)$$

where κ is the curvature of the curve, s is arc length, and constants a and b are both greater than zero. This equation is of importance in various applications, so numerous papers have appeared attempting to solve it [1-6]. One of contributions in the variational approach is due to Mumford, Nitzberg, and Shiota [7], where they proposed a method for segmenting an image into objects which should be ordered according to their depth in the scene. In order to connect T-junctions at the occluding boundaries of objects, they looked for a continuation curve Γ which minimizes (1.1). Following the work [7] and observing the importance of level lines for image representation, the authors in [8] adapted the variational continuation framework of [7] to level line structures. They proposed a variational formulation for the recovery of the missing parts of a grey level image. They referred to this interpolation process as disocclusion. Consider an image from which a portion ("domain") D is "in-painted" (that is, missing from the data set). After omitting the angular terms and taking a domain $\tilde{D}$ slightly bigger than the inpainting domain D such that $D \subset \subset \tilde{D}$, their minimization criterion becomes:

$$E = \int_{-\infty}^{\infty} \sum_{\Gamma \in F_\lambda} \int_\Gamma (a + b|\kappa|^p) \, dH^1 \, d\lambda \quad (1.2)$$

where $p \geq 1$, $H^1$ denotes the one-dimensional Hausdorff measure, and the elements of $F_\lambda$ are the union of completion curves and the restrictions to $D\backslash\tilde{D}$ of the associated level lines. In other words, in the boundary region where $\tilde{D}$ extends beyond the region D where data is missing, there are a number of intensity levels labeled by variable λ (e.g. grey scale levels). A given reconstruction of the missing data can be considered as a set of lines $\{F_\lambda\}$ extending across the region $\tilde{D}$, with one or more lines $F_\lambda$ for each value of λ. For a given value of λ, the sum over Γ corresponds to taking Γ as the lines $\{F_\lambda\}$ successively, calculating a component of the energy for each line, and adding those components. Then an integral over λ is performed to give the equation (1.2) which defines an energy E for the entire image. The lines $\{F_\lambda\}$ are then sought which minimize this energy.

In order to study the inpainting problem from the viewpoint of the calculus of variations, Ambrosio and Masnou [9] rewrite Eqn. (1.2), assuming that the curves F are the level lines of a smooth function u, as $$E(u) = \int_{-\infty}^{\infty} (\int_{\partial(u \geq \lambda) \cap D} (a + b|\kappa|^p) d\mathcal{H}^1) d\lambda \quad (1.3)$$

Using the change of variable, the energy functional becomes:

$$E(u) = \int_{\tilde{D}} \left(a + b\left|\nabla \cdot \frac{\nabla u}{|\nabla u|}\right|^p\right) |\nabla u|. \quad (1.4)$$

As noted in [9], this criterion makes sense only for a certain class of smooth functions and needs to be relaxed in order to deal with more general functions. So they extend the energy functional (1.4) to the whole $L^1$ ($\mathbb{R}^2$):

$$E(u) = \begin{cases} \int_{\tilde{D}} \left(a + b\left|\nabla \cdot \frac{\nabla u}{|\nabla u|}\right|^p\right) |\nabla u| & \text{if } u \in C^2(\mathbb{R}^2) \\ \infty & \text{if } u \in L^1(\mathbb{R}^2) \backslash C^2(\mathbb{R}^2), \end{cases} \quad (1.5)$$

Then, they define the relaxed functional associated with Eqn. (1.5) as:

$$\bar{E}(u) = \inf\{\lim_{h \to \infty} \inf E(u_h) : u_h \to u \in L^1\} \quad (1.6)$$

They show the existence of an optimal solution and the coincidence between E and the associated relaxed functional $\bar{E}$ on $C^2$ functions. The authors in [10] derived the Euler-Lagrange equation associated with (1.4) in the case N=2, p>1, and proposed some explicit numerical schemes to solve the corresponding Euler Lagrangian equation. However, their resulting Euler-Lagrange equation is nonlinear fourth order, so the computational cost becomes an issue. Another approach by relaxation is reported in [11], where the authors proposed a relaxed formulation of (1.4) and the term $$\frac{\nabla u}{|\nabla u|}$$

is replaced with a vector field θ.

SUMMARY OF THE INVENTION

The present invention aims to provide a fast and efficient algorithm to solve the minimization problem related to Euler's elastica energy.

In general terms, the invention proposes that the Euler's elastica energy is converted into an energy functional with specially designed constraints, and the stationary point of the constraint energy functional is sought by the augmented Lagrangian method.

The Euler's elastica energy is defined using a first degraded image and a second image. The augmented Lagrangian functional is obtained from the Euler's elastica energy using a plurality of supplementary variables and Lagrange multipliers, and the stationary point is stationary with respect to the second image, the supplementary variables and the Lagrange multipliers.

Embodiments of the invention include methods for variational image denoising, repairing image inpainting (that is attempting to reconstruct missing portions of an image), and image zooming.

Augmented Lagrangian method has previously been used in image processing applications for minimization of energy functionals in total variation (TV) model, vectorial TV, and higher order models [23-25]. In this case, augmented Lagrangian method is equivalent to very well known methods such as dual methods and split Bregman method. Note that many fast algorithms based on dual approach to efficiently solve TV minimization problem have been proposed since its introduction by Rudin, Osher and Fatemi [12] as a regularization criterion for image denoising. For interested readers, please refer to [13-25] and references therein. The purpose of the invention is to produce some fast algorithms for minimization problems related to curvatures for level curves. So far, there are not many available fast algorithms for Euler's elastica models. We are only aware of the graph cut approaches of [51,52] and reformulation of the problem of region-segmentation with curvature regularity as an integer linear program [50]. None of these was an Euler's elastic model, and the functional is critically different. The functionals in [13-25] are convex, implying that standard convex optimization algorithm can be applied, and they are efficient and fast. By contrast, the functional for an Euler's elastica model is highly non-convex, so standard techniques may not be successful. Moreover, the Euler's elastica model has high order derivatives and non-linearity which would be further factors in dissuading its use, unless fast and efficient algorithms are devised.

The invention makes possible a fast and efficient method for the minimization of an energy functional related to Euler's elastica. It had previously been observed that it was very difficult to minimize the energy due to its non-convexity and high-nonlinearity, and because it includes higher-order derivatives. Certain embodiments of the invention have been found to be fast to converge and simple to implement.

Preferably, the augmented Lagrangian functional is of the form:

$$\mathcal{L}(v, u, m, p, n; \lambda_1, \lambda_2, \lambda_3, \lambda_4) =$$

$$\int_\Omega (a + b(\nabla \cdot n)^2)|p| + \frac{\eta}{s}\int_\Gamma |v - u_o|^s + r_1 \int_\Omega (|p| - m \cdot p) +$$

$$\int_\Omega \lambda_1(|p| - m \cdot p) + \frac{r_2}{2}\int_\Omega |p - \nabla u|^2 + \int_\Omega \lambda_2 \cdot (p - \nabla u) +$$

$$\frac{r_3}{2}\int_\Omega (v - u)^2 + \int_\Omega \lambda_3(v - u) + \frac{r_4}{2}\int_\Omega |n - m|^2 + \int_\Omega \lambda_4 \cdot (n - m) + \delta_R(m)$$

where:
(i) a, b and $\eta$ are parameters which are greater than zero, and s is a parameter which is greater than or equal to 1;
(ii) the first image is a set of values $u_0$ defined at a set of respective points $\Gamma$, and the second image is a set of values u defined at a set of respective points $\Omega$, where the set of points $\Omega$ comprises the set of points $\Gamma$;
(iii)

$$\int_\Omega \text{ and } \int_\Gamma$$

denote respectively integrals over the sets of points $\Omega$ and $\Gamma$;
(iv) v, m, p and n are supplementary variables,
(v) $r_1$, $r_2$, $r_3$, and $r_4$ are positive penalty parameters; and
(vi) $\lambda_1$, $\lambda_2$, $\lambda_3$, and $\lambda_4$ are Lagrange multipliers.

Note that this functional uses $L^1$ type penalization of the constraint p·n=|p|, which is not standard in augmented Lagrangian methods.

The invention may be expressed as a method implemented by a computer, typically without human intervention (except to initiate the method and optionally to set certain numerical parameters which it employs). Alternatively, the invention may be expressed as a computer system programmed to implement the method, or as a computer program product (e.g. a tangible recording medium) including program instructions operative by a computer processor to cause the computer to perform the method.

BRIEF DESCRIPTION OF THE DRAWINGS

Embodiments of the invention will now be described with reference to the following figures, in which:

FIG. 3 is composed of FIGS. 3(a)-3(d), of which FIGS. 3(a) and 3(c) illustrate problems addressed by the embodiment, and FIGS. 3(b) and 3(d) illustrate the results;

FIG. 6 is composed of FIGS. 6(a) and 6(b), in which FIG. 6(a) illustrates a further problem addressed by the embodiment, and FIG. 6(b) illustrates the result;

FIG. 7 is composed of FIGS. 7(a) and 7(b), in which FIG. 7(a) illustrates a further problem addressed by the embodiment, and FIG. 7(b) illustrates the result;

FIG. 10 is composed of FIGS. 10(a) and 10(b), in which FIG. 10(a) illustrates a further problem addressed by the embodiment, and FIG. 10(b) illustrates the result;

FIG. 11 is composed of FIGS. 11(a) and 11(b), in which FIG. 11(a) illustrates a further problem addressed by the embodiment, and FIG. 11(b) illustrates the result;

FIG. 13 is composed of FIGS. 13(a) and 13(b), in which FIG. 13(a) illustrates a further problem addressed by the embodiment, and FIG. 13(b) illustrates the result;

FIG. 14 is composed of FIGS. 14(a) and 14(b), in which FIG. 14(a) illustrates a further problem addressed by the embodiment, and FIG. 14(b) illustrates the result; and FIG. 15 is composed of FIGS. 15(a)-(d), of which FIG. 15(a) shows a small image, FIG. 15(d) shows a zoomed version of FIG. 15(a) produced by the embodiment, and FIGS. 15(b) and (c) are comparative examples produced by alternative methods.

DETAILED DESCRIPTION OF THE EMBODIMENTS

Figure 1A:
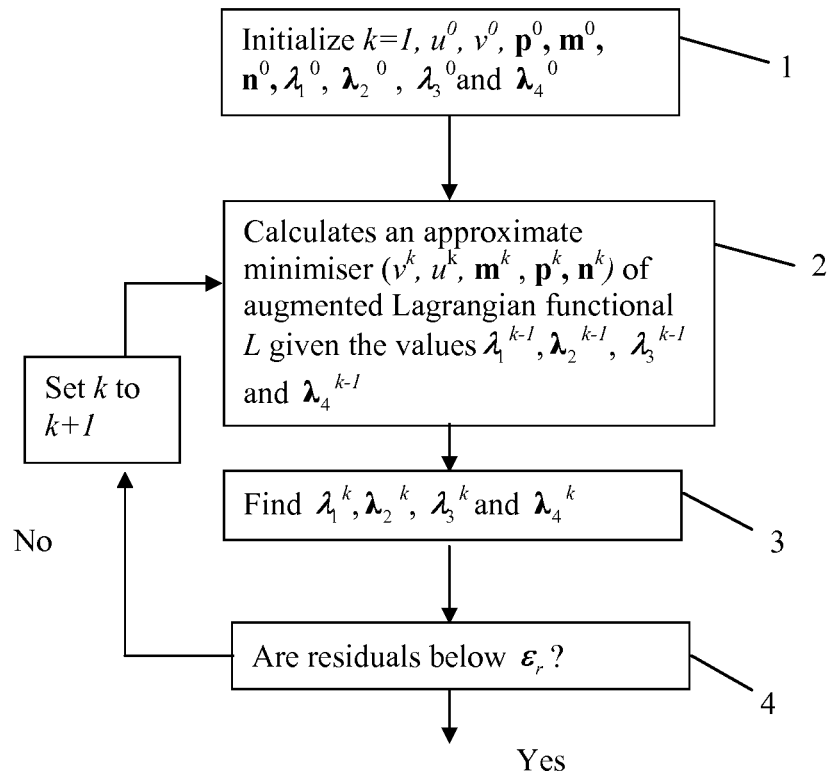
FIG. 1, which is composed of FIGS. 1(a) and 1(b), is a flow diagram of an embodiment of the invention.
Figure 1B:
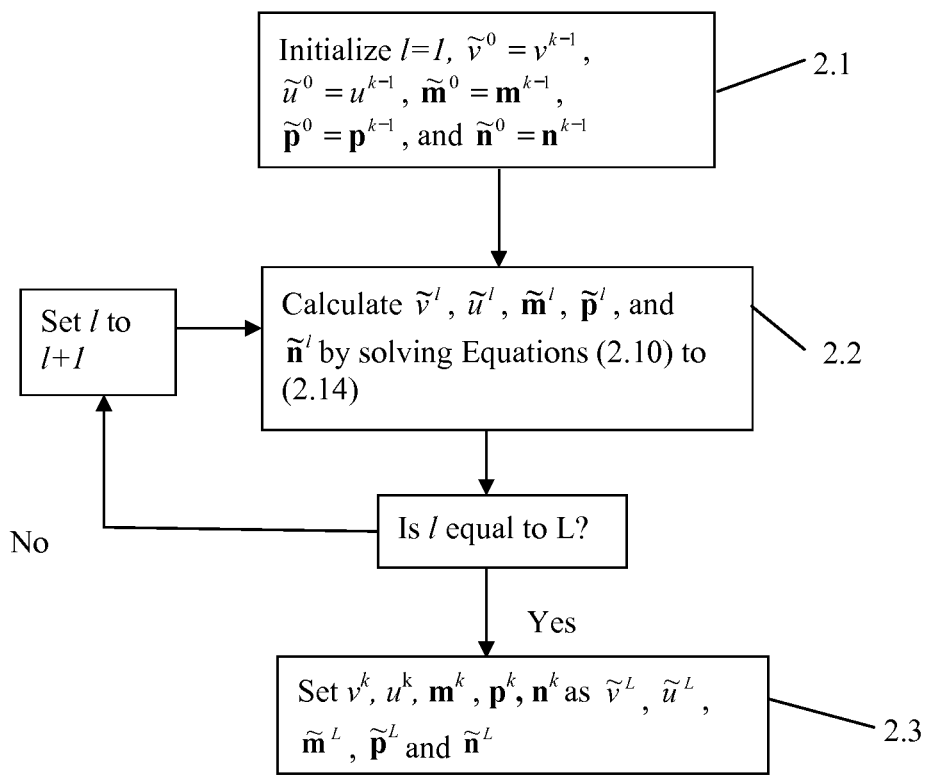

1. Overview of the Explanation of the Embodiment

An embodiment of the invention will now be described. For clarity of presentation, the embodiment presented with applications to two-dimensional problems. However, the approach can straight-forwardly be extended to higher dimensional problems. We will first in section 2 explain the theory underlying the embodiment. Then, in Section 3, we will explain how the theory is implemented numerically. The following explanation uses the standard definitions for Sobolev spaces. Following mathematical conventions, we will use boldface letters to denote vector functions.

2. Augmented Lagrangian Method

Assume that we are operating in a two-dimensional space ("domain $\Omega$"), and that data is given concerning a sub-set F of the domain $\Omega$ (the term "subset" is here used to include the possibility that F is the whole of $\Omega$, a possibility which, as explained below, is of importance to some embodiments). That is, $\Gamma \subset \Omega \subset R^2$.

The given data is denoted by:

$$u_0 : \Gamma \rightarrow [0,1].$$

That is, there is a data value $u_0$ in the range 0 to 1 at each point in $\Gamma$.

For applications to image processing, the domain $\Omega$ is normally a rectangle or a grid spanning a rectangular domain.

For different applications, the subset $\Gamma$ and data $u_0$ have different meanings, as follows.

For image denoising, $u_0$ is a noisy image and $\Gamma = \Omega$.

For image inpainting, we have at least one inpainting domain $D \subset \Omega$ where the image data is missing or degraded. The domain D cannot not include the whole of $\Omega$. Note that the inpainting domain may be the collection of multiple connected regions. The data $u_0$ is an image in the rest of the domain $\Omega$. In mathematical notation, $\Gamma = \Omega \backslash D$.

For this application, the values of $u_0$ on boundaries of the inpainting domain D need to be propagated into the inpainting domain via minimization of the Euler's elastica energy.

For image zooming, the input to the method is an image denoted by $\bar{u}_0$ and having $M_1 \times M_2$. In mathematical notation, the array of pixels can be denoted as $[1,M_1] \times [1,M_2]$. This image is to be expanded by a fixed ratio r where r is an integer. We denote the image domain $\Omega$ as a set of points $[1,r(M_1-1)+1] \times [1,r(M_2-1)+1]$ and define the set of points $\Gamma = \{(i,j) \in \Omega | i=1 \mod r, j=1 \mod r\}$. Thus, $\Gamma$ has the same number of points as image $\bar{u}_0$, and we assign the values of $u_0$ to be equal to the corresponding intensity levels of the corresponding pixels of $\bar{u}_0$. In other words, from the values of $u_0$ on $\Gamma$ assigned by $\bar{u}_0$, we need to construct an enlarged image defined on $\Omega$. The image values on $\Omega \backslash \Gamma$ are interpolated via Euler's elastica energy.

In order to use Euler's elastica energy minimization for the above mentioned applications, we minimize the following functional:

$$\int_\Omega \left(a + b\left(\nabla \cdot \frac{\nabla u}{|\nabla u|}\right)^2\right) |\nabla u| + \frac{\eta}{s} \int_\Gamma |u - u_o|^s, \quad (2.1)$$

where u is the function with respect to which Eqn (2.1) is minimized, $u_0$ is the given data, $\eta > 0$, and $s \geq 1$. The output of the embodiment is u at all the points of $\Omega$.

In image denoising, the choice of s is determined by the type of noise found in $u_0$. For example, s=2 for Gaussian white noise and s=1 for salt-and-pepper noise. For image inpainting and image zooming, we use s=1 to preserve the contrast of a given image.

As an aside, we observe that for inpainting, the embodiment may alternatively minimize the following energy functional:

$$\int_D \left(a + b\left(\nabla \cdot \frac{\nabla u}{|\nabla u|}\right)^2\right) |\nabla u| \quad (2.2)$$

where $\partial D$ is the boundary of the inpainting domain D, and $u|_{\partial D} = u_0$. If the size of D is much smaller than $\Omega$, this approach may give faster numerical convergence than using functional (2.1). The augmented Lagrangian, in this case, is the same as in (2.8) (which is explained below) but with the integral over $\Omega$ replaced by an integral over D. It is believed that in case of image denoising, this will be reasonably efficient. However, in case of image inpainting, it may not be straightforward if the inpainting domain is irregular because of boundary conditions for the vectors. At any rate, in the following explanation, for the sake of simplicity, we will use the model given by functional (2.1) for all applications.

Now, we propose to cast the functional (2.1) into a constrained minimization problem by introducing two variables p and n, defined as $p = \nabla u$ and $$n = \frac{\nabla u}{|\nabla u|}$$

The last constraint above can be reformulated as $|p|n=p$. A variation of the present embodiment could use a Lagrangian or augmented Lagrangian method to minimize functional (2.1) under these constraints. The corresponding augmented Lagrangian functional is:

$$L(u, p, n; \lambda_1, \lambda_2) = \qquad (2.3)$$
$$\int_\Omega (a + b(\nabla \cdot n)^2)|p| + \frac{\eta}{s}\int_\Gamma |u - u_0|^s + \frac{r_1}{2}\int_\Omega ||p|n - p|^2 +$$
$$\int_\Omega \lambda_1 (|p|n - p) + \frac{r_2}{2}\int_\Omega |p - \nabla u|^2 + \int_\Omega \lambda_2 \cdot (p - \nabla u)$$

The functional (2.3) written by a formal way of using augmented Lagrangian method still has many difficulties to find a stationary point. The main reason is caused by non-linearity constraint $|p|n=p$ and $L^2$ penalization. However, the proposed embodiment described here uses operator splitting ideas and specially designed variables to obtain an iterative algorithm that is practically simple to implement and very fast.

First, we note that the following result follows easily from the well-known Holder inequality. Given two vectors $n \neq 0$, $p \neq 0$ which satisfy:

$$|n| \leq 1 \text{ and } |p| = n \cdot p, \quad (2.4)$$

then we have:

$$n = \frac{p}{|p|} \quad (2.5)$$

In order to obtain an efficient algorithm, the embodiment uses operator splitting, by introducing a new variable m with the constraint n=m.

As a consequence of identity (2.5), it is easy to see that minimization of the functional (2.1) is equivalent to the following minimization problem:

$$\min_{u, v, m, p, n} \int_\Omega (a + b(\nabla \cdot n)^2)|p| + \frac{\eta}{s}\int_\Gamma |v - u_0|^s \quad (2.6)$$

with v=u, $p=\nabla u$, n=m, $|p|=m \cdot p$, $|m| \leq 1$. When $s \neq 2$ or $\Gamma$ is not the whole of $\Omega$, we also need to introduce another variable v to split the nonlinearity. In case that s=2 and $\gamma = \Omega$, this new variable v is not needed and the modifications for the resulting algorithm is easily obtained by slightly modifying the embodiment as explained below, for example by referring to the techniques explained in [23, 24, 26].

Before we show how the embodiment solves the proposed constrained minimization of (2.6), let us explain the variable m. The use of m with $|m|\leq 1$ can be viewed as relaxation, similar to the relaxation approach proposed in [11]. Moreover, the constraint $|m|\leq 1$ is crucial to prevent the unboundedness of m when p=0. In order to impose the constraint $|m|\leq 1$ at all points in $\Omega$, we define a set $$R=\{m\epsilon L^2(\Omega)| |m|\leq 1 \text{ at all points in } \Omega\}$$

and a characteristic function $\delta_R(\bullet)$ on R:

$$\delta_R(m) = \begin{cases} 0 & m \in \mathcal{R}, \\ +\infty & \text{otherwise.} \end{cases}$$

As indicated in Lions-Mercier [27], for a given $m_0$ the following minimization problem $$\min_m \int_\Omega (m - m_0)^2 + \delta_R(m)$$

has an explicit solution given by $$m = proj_R(m_0) = \begin{cases} m_0 & |m_0| \leq 1, \\ \frac{m_0}{|m_0|} & \text{otherwise} \end{cases} \quad (2.7)$$

In order to efficiently solve the proposed constrained optimization problem (2.6), we define the following augmented Lagrangian functional:

$$\mathcal{L}(v, u, m, p, n; \lambda_1, \lambda_2, \lambda_3, \lambda_4) = \int_\Omega (a + b(\nabla \cdot n)^2)|p| + \quad (2.8)$$

$$\frac{\eta}{s}\int_\Gamma |v - u_o|^s + r_1 \int_\Omega ||p| - m \cdot p| + \int_\Omega \lambda_1(|p| - m \cdot p) +$$

$$\frac{r_2}{2}\int_\Omega |p - \nabla u|^2 + \int_\Omega \lambda_2 \cdot (p - \nabla u) + \frac{r_3}{2}\int_\Omega (v - u)^2 +$$

$$\int_\Omega \lambda_3(v - u) + \frac{r_4}{2}\int_\Omega |n - m|^2 + \int_\Omega \lambda_4 \cdot (n - m) + \delta_R(m)$$

where $\lambda_1, \lambda_2, \lambda_3$ and $\lambda_4$ are Lagrange multipliers and $r_1, r_2, r_3$, and $r_4$ are positive penalty parameters. Note that $\lambda_2$ and $\lambda_4$ are vectors.

Due to the constraint $|m|\leq 1$ we have that $|p|-m\cdot p\geq 0$ at all points in $\Omega$. That is the reason why the embodiment does not use $L^2$ penalization for the term multiplied by $r_1$.

In convex optimization, it is known that one of saddle points for the augmented Lagrangian functional will give a minimizer for the constrained minimization problem (2.6). The embodiment uses the following iterative algorithm to find a stationary point of (2.8). Steps 2 and 3 of the following algorithm are performed multiple times, and the variable k is used to label these times, such that k=1 corresponds to the first time the steps are performed, and so on. The process of the embodiment is summarized in FIGS. 1(a) and (b).

1. In step 1, we initialize u, v, p, m, n, $\lambda_1, \lambda_2, \lambda_3$ and $\lambda_4$, by setting them respectively to values which are denoted as $u^0$, $v^0, p^0, m^0, n^0, \lambda_1^0, \lambda_2^0, \lambda_3^0$ and $\lambda_4^0$. In fact, in the experiments presented below, all these initial values are simply zero. Alternatively, the embodiment may optimally initialize these variables in each application. For instance, in the case of image denoising, the variables $v^0, u^0, m^0$, and $p^0$ can be initialized to a given noisy data $u_0$:
$u^0=u_0, p^0=\nabla u_0$ and $$n^0 = m^0 = \frac{\nabla u_0}{|\nabla u_0|}$$

at all points of $\Omega$.

Nevertheless, even though more optimized initialization may give faster numerical results, the experimental results below were obtained by initializing all variables and Lagrange multipliers to zero, to make the comparisons with other methods simpler.

2. When step 2 is performed for the k-th time (k$\geq$1), the embodiments calculates a minimiser $(v^k, u^k, m^k, p^k, n^k)$ given the values $\lambda_1^{k-1}, \lambda_2^{k-1}, \lambda_3^{k-1}$ and $\lambda_4^{k-1}$ of the expression:

$$(v^k,u^k,m^k,p^k,n^k)=\text{argmin}_{v,u,m,p,n}L(v,u,m,n,p,\lambda_1^{k-1},\lambda_2^{k-1},\lambda_3^{k-1},\lambda_4^{k-1}). \quad (2.9)$$

Since it is very difficult to minimize L in terms of v, u, m, p, n simultaneously, we use an alternating minimization process to approximate $v^k, u^k, m^k, p^k, n^k$ as the following substeps.

2.1 Define $\tilde{v}^0=v^{k-1}, \tilde{u}^0=u^{k-1}, \tilde{m}^0=m^{k-1}, \tilde{p}^0=p^{k-1}$, and $\tilde{n}^0=n^{k-1}$.

2.2 For l=1, ... L, solve the following problems sequentially:

$$\tilde{v}^l \approx \arg\min L)v,\tilde{u}^{l-1},\tilde{m}^{l-1},\tilde{p}^{l-1},\tilde{n}^{l-1},\lambda_1^{k-1},\lambda_2^{k-1},\lambda_3^{k-1},\lambda_4^{k-1}) \quad (2.10)$$

$$\tilde{u}^l \approx \arg\min L)\tilde{v}^l,u,\tilde{m}^{l-1},\tilde{p}^{l-1},\tilde{n}^{l-1},\lambda_1^{k-1},\lambda_2^{k-1},\lambda_3^{k-1},\lambda_4^{k-1}) \quad (2.11)$$

$$\tilde{m}^l \approx \arg\min L)\tilde{v}^l,\tilde{u}^l,m,\tilde{p}^{l-1},\tilde{n}^{l-1},\lambda_1^{k-1},\lambda_2^{k-1},\lambda_3^{k-1},\lambda_4^{k-1}) \quad (2.12)$$

$$\tilde{p}^l \approx \arg\min L)\tilde{v}^l,\tilde{u}^l,\tilde{m}^l,p,\tilde{n}^{l-1},\lambda_1^{k-1},\lambda_2^{k-1},\lambda_3^{k-1},\lambda_4^{k-1}) \quad (2.13)$$

$$\tilde{n}^l \approx \arg\min L)\tilde{v}^l,\tilde{u}^l,\tilde{m}^l,\tilde{p}^l,n,\lambda_1^{k-1},\lambda_2^{k-1},\lambda_3^{k-1},\lambda_4^{k-1}) \quad (2.14)$$

Note that problems (2.10-2.14) can be solved by minimizing the following energy functional respectively:

$$E_1(v) = \frac{\eta}{s}\int_\Gamma |v - u_o|^s + \int_\Omega \frac{r_3}{2}(v - \tilde{u}^{l-1})^2 + \lambda_3^{k-1}v \quad (2.15)$$

$$E_2(u) = \int_\Omega \frac{r_2}{2}|\tilde{p}^{l-1} - \nabla u|^2 - \lambda_2^{k-1} \cdot \nabla u + \frac{r_3}{2}(\tilde{v}^l - u)^2 + \lambda_3^{k-1}(-u) \quad (2.16)$$

$$E_3(m) = \delta_R(m) + \int_\Omega \frac{r_4}{2}(\tilde{n}^{l-1} - m) - \lambda_4^{k-1} \cdot m - (r_1 + \lambda_1)m \cdot \tilde{p}^{l-1}, \quad (2.17)$$

Note that the last term in (2.17) is added.

$$E_4(p) = \int_\Omega (a + b(\nabla \cdot \tilde{n}^{l-1})^2)|p| + \quad (2.18)$$

$$(r_1 + \lambda_1^{k-1})(|p| - \tilde{m}^l \cdot p) + \frac{r_2}{2}|p - \nabla u^l|^2 + \lambda_2^{k-1} \cdot p,$$

$$E_5(n) = \int_\Omega b(\nabla \cdot n)^2|\tilde{p}^l| + \frac{r_4}{2}|n - m^l|^2 + \lambda_4^{k-1} \cdot n \quad (2.19)$$

Note that for s=1 or 2 the minimizations (2.15), (2.17) and (2.18) can be done by simple arithmetic calculations, and thresholding at each grid point (as explained below). There is no need to solve any equations. Minimisations (2.16) and (2.19) require a linear equation to be solved over the whole of Ω. For image processing in which the mesh is uniform, FFT and AOS schemes [28, 29] can be done at very low computational cost.

In Section 3.2, we show the details for the implementation for the algorithms given in (2.15) to (2.19). Especially, we shall present the details in a discrete setting. This will make it more clear for implementations. We numerically observe that L=1 is enough to obtain desirable results in image denoising, image inpainting, and image zooming.

2.3 Set $(v^k, u^k, m^k, p^k, n^k) = (\tilde{v}^L, \tilde{u}^L, \tilde{m}^L, \tilde{p}^L, \tilde{n}^L)$ 3. In step 3, we update the Lagrange multipliers as follows:

$$\lambda_1^k = \lambda_1^{k-1} + r_1(|p^k| - m^k \cdot p^k), \quad (2.20)$$

$$\lambda_2^k = \lambda_2^{k-1} + r_2(p^k - \nabla u^k), \quad (2.21)$$

$$\lambda_3^k = \lambda_3^{k-1} + r_3(v^k - u^k) \quad (2.22)$$

$$\lambda_4^k = \lambda_4^{k-1} + r_4(n^k - m^k) \quad (2.23)$$

4. In step 4, we determine the relative residuals and return to step 2 unless they are smaller than a predetermined parameter denoted by $\epsilon_r$. k is set to k+1.

3. Numerical Discretization

Figure 2:
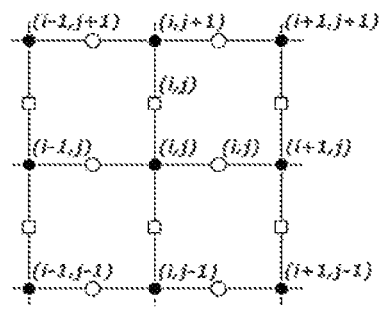
FIG. 2 shows a grid used in an implementation of the embodiment of FIG. 1.

FIG. 2 shows a grid which can be used in the numerical solution of the equations in Section 1, specifically by solving equations (2.15-2.19) and (2.20-2.23). For each value of (i,j) there are three points, labeled respectively by ●, ○ and □ (square). u, v, $\lambda_1$ and $\lambda_3$ are defined on ●-nodes. The first and second components of p, n, $\tilde{\lambda}_2$, and $\tilde{\lambda}_4$ are defined on ○-nodes and □-nodes, respectively.

First of all, we will introduce notation. Then we will present the details on how to solve the sub-minimization problems.

3.1 Notation

Let $\Omega \equiv [1, N_1] \times [1, N_2]$ be a set of $N_1 N_2$ points in $R^2$. For simplicity, we denote two inner product vector spaces:

$$X = R^{N_1 N_2} \text{ and } Y = X \times X.$$

For a given $(i, j) = [1, N_1] \times [1, N_2]$ we see that:

$$u \in X, u(i,j) \in R \text{ and } p \in Y, p(i,j) = (p_1(i,j), p_2(i,j)) \in R^2$$

We define the standard Euclidean inner products as follows:

$$(u, v)_X \equiv \sum_{i,j} u(i,j) v(i,j) \text{ and } (p, q)_Y \equiv (p_1, q_1)_X + (p_2, q_2)_X.$$

Note that the induced norms ‖·‖ are the $l_2$-norm on vector spaces V=X and Y.

The discrete backward and forward differential operators for u∈x are defined with the periodic condition:

$$\partial_1^- u(i,j) \equiv \begin{cases} u(i,j) - u(i-1,j), & 1 < i \le N_1, \\ u(i,j) - u(N_1,j), & i=1, \end{cases}$$

$$\partial_2^- u(i,j) \equiv \begin{cases} u(i,j) - u(i,j-1), & 1 < j \le N_2, \\ u(i,j) - u(i,N_2), & j=1, \end{cases}$$

$$\partial_1^+ u(i,j) \equiv \begin{cases} u(i+1,j) - u(i,j), & 1 < i \le N_1, \\ u(1,j) - u(N_1,j), & i=N_1, \end{cases}$$

$$\partial_2^+ u(i,j) \equiv \begin{cases} u(i,j+1) - u(i,j), & 1 < i \le N_2, \\ u(i,1) - u(i,N_2), & j=N_2, \end{cases}$$

We define the discrete forward (+) and backward (−) gradient operator $\nabla^\pm : X \to Y$:

$$\nabla^\pm u(i,j) \equiv (\partial_1^\pm u(i,j), \partial_2^\pm u(i,j)). \quad 1$$

Considering inner products on X and Y, the corresponding discrete backward (−) and forward (−) adjoint operator div$^\pm$: Y→X of $-\nabla^\pm$ is obtained:

$$\text{div}^\pm p(i,j) \equiv (\partial_1^\mp p_1(i,j) + \partial_2^\mp p_2(i,j))$$

When a variable defined on ○-nodes (or □-nodes) needs to be evaluated at (i,j)∈□-nodes (or ○-nodes), we use the average operators:

$$\mathcal{A}_{i,j}^\square(n_1) = \frac{n_1(i, j+1) + n_1(i-1, j+1) + n_1(i, j) + n_1(i-1, j)}{4} \quad (3.1)$$

$$\mathcal{A}_{i,j}^\circ(n_2) = \frac{n_2(i+1, j) + n_2(i, j) + n_2(i+1, j-1) + n_2(i, j-1)}{4}$$

where $n_1$ and $n_2$ are defined on ○-nodes and □-nodes, respectively. We also use a special operator to measure the magnitude of vector $p = (p_1, p_2)$ at $(i,j) \in$ ●-nodes, where $p_1$ and $p_2$ are defined on ○-nodes and □-nodes, respectively:

$$|\mathcal{A}|_{i,j}^\bullet(p) = \left( \left( \frac{p_1(i,j) + p_1(i-1,j)}{2} \right)^2 + \left( \frac{p_2(i,j) + p_2(i,j-1)}{2} \right)^2 \right)^{\frac{1}{2}} \quad (3.2)$$

When we compute the divergence of a vector $n = (n_1, n_2)$ at $(i,j) \in$ ●-nodes, where $n_1$ and $n_2$ are defined on ○-nodes and □-nodes, we use the following operator:

$$\text{div}_{i,j}^{-\bullet}(n)(i,j) = n_1((i-1,j) + n_2(i,j) - n_2(i,j-1). \quad (3.3)$$

3.2 Subproblems

In this subsection, we explain how to find the minimizers of $\epsilon_i$ (1≤i≤5) shown from (2.15) to (2.19). For simplicity of notations, we denote the fixed Lagrange multipliers in the previous $(k-1)^{th}$ iteration as $\lambda_1 = \lambda_1^{k-1}, \lambda_2 = \lambda_2^{k-1}, \lambda_3 = \lambda_3^{k-1}$ and $\lambda_4 = \lambda_4^{k-1}$.

3.2.1 Minimization of $\epsilon_i(v)$ in (2.15)

We denote a fixed variable as $\tilde{u}^{t-1}$. We note that one can combine the last two terms in $\epsilon_i(v)$ into one term. Let $$w = u - \frac{\lambda_3}{r_3}.$$

Then we have $$\epsilon_1(v) = \frac{\eta}{s} \int_\Gamma |v - u_o|^2 + \frac{r_3}{2} \int_\Omega (v - w)^2 + \overline{C}_1$$

Since $\overline{C}_1$ does not depend on v, the minimization of $\epsilon_i(v)$ can be done by minimizing the following discrete energy functional for fixed u:

$$\tilde{\epsilon}_1(v) = \tilde{\epsilon}_{\Omega/\Gamma}(v) + \tilde{\epsilon}_\Gamma(v)$$

where $$\tilde{\epsilon}_\Gamma(v) = \sum_{(i,j)\in\Gamma} \left( \frac{\eta}{s} |v(i,j) - u_o(i,j)|^s + \frac{r_3}{2} |v(i,j) - w(i,j)|^2 \right)$$

$$\tilde{\epsilon}_{\Omega\setminus\Gamma}(v) = \sum_{(i,j)\in\Omega\setminus\Gamma} \frac{r_3}{2} |v(i,j) - w(i,j)|^2, (i,j) \in \bullet - \text{nodes}$$

For a grid point $(i,j) \in \Omega \setminus \Gamma$, the minimizer v(i,j) is $$v(i,j) = w(i,j).$$

For a grid point $(i,j)\in\Gamma$, the minimizer $v(i,j)$ with $s=2$ is $$v(i, j) = \frac{\eta u_o(i, j) + r_3 w(i, j)}{\eta + r_3}$$

When $s=1$, we use the same approach as in [25] to find the closed-form formula for the minimizer $v(i,j)$ for a grid point $(i,j)\in\Gamma$:

$$v(i,j) = u_o(i,j) + M(i,j)(w(i,j) - u_o(i,j)),$$

where $$M(i, j) = \max\left\{0, 1 - \frac{\eta}{r_3 |w(i, j) - u_o(i, j)|}\right\}$$

See more details in [25] on how to find a minimizer $v(i,j)$ for a grid point $(1,1)\in\Gamma$.

To sum up, the updated $\tilde{v}^1$ is obtained by the following formulas:

$$(i, j) \notin \Gamma \Rightarrow \tilde{v}^l(i, j) = w(i, j), \qquad (3.4)$$

$(i, j) \in$ $$\Gamma \Rightarrow \begin{cases} \tilde{v}^l(i, j) = \dfrac{\eta u_o(i, j) + r_3 w(i, j)}{\eta + r_3}, & \text{if } s = 2, \\ \tilde{v}^l(i, j) = u_o(i, j) + M(i, j)(w(i, j) - u_o(i, j)), & \text{if } s = 1 \end{cases}$$

3.2.2 Minimization of $\epsilon_2(u)$ in (2.16)

We denote fixed variables $\tilde{v}^1$ and $\tilde{p}^{l-1}$ as $v$ and $p$, respectively. The Euler-Lagrange equation (2.16) yields a linear equations:

$$-r_2 \text{div}^- \nabla^+ u + r_3 u = -r_2 \text{div}^- p - \text{div}^- \lambda_2 + r_3 v + \lambda_3 \qquad (3.5)$$

Since periodic boundary condition is imposed, it can be efficiently solved by the fast Fourier transform (FFT). Using the notation in Section 3.1, the above equation can be written as:

$$-r_2(\partial_1^- \partial_1^+ + \partial_2^- \partial_2^+)u + r_3 u = g$$

where $g = -r_2(\partial_1^- p_1 + \partial_2^- p_2) - (\partial_1^- \lambda_{21} + \partial_2^- \lambda_{22}) + r_3 v + \lambda_3$. Introducing the identity operator $If(i,j) = f(i,j)$ and shifting operators, $$S_1^\pm f(i,j) = f(i\pm1,j) \text{ and } S_2^\pm f(i,j) = f(i,j\pm1) \qquad (3.6)$$

the discretization of the equation (3.5) at ●-nodes is as follows:

$$(-r_2(S_1^- - 2I + S_1^+ + S_2^- - 2I + S_2^+) + r_3)u(i,j) = g(i,j),$$

where $$g(i,j) = -r_2(I - S_1^-)p_1(i,j) - r_2(I - S_2^-)p_2(i,j)$$

$$-(I - S_1^-)\lambda_{21}(i,j) - (I - S_2^-)\lambda_{22}(i,j) + r_3 v(i,j) + \lambda_3(i,j)$$

Now, we apply the discrete Fourier transform F. The shifting operator is a discrete convolution and its discrete Fourier transform is the componentwise multiplication in the frequency domain. For discrete frequencies, $y_i$ and $y_j$, we have $$\mathcal{F}_{S_1^\pm}(y_i, y_j) = e^{\pm\sqrt{-1}z_i} \mathcal{F}_f(y_i, y_j) \text{ and } \mathcal{F}_{S_2^\pm}(y_i, y_j) = e^{\pm\sqrt{-1}z_j} \mathcal{F}_f(y_i, y_j) \qquad (3.7)$$

where $$z_i = \frac{2\pi}{N_1} y_i, y_i = 1, \ldots, N_1 \text{ and } z_j = \frac{2\pi}{N_2} y_j, y_j = 1, \ldots, N_2. \qquad (3.8)$$

It yields an algebraic equation:

$$(-2r_2(\cos z_i + \cos z_j - 2) + r_3) \mathcal{F} u(y_i, y_j) = \mathcal{F} g(y_i, y_j),$$

Note that $r_3 > 0$. The discrete inverse Fourier transform F gives the updated $\tilde{u}^1$.

3.2.3 Minimization of $\epsilon_3(m)$ in (2.17)

We denote a fixed variable $\tilde{n}^{l-1}$ and $\tilde{p}^{l-1}$ as $n$ and $p$, respectively. In a similar way as getting the closed-form solution of (2.15), we also obtain the close-form solution of (2.17) by re-writing the minimization functional in the form:

$$\epsilon_3(m) = \delta_R(m) + \frac{r_4}{2} \int_\Omega \left| \frac{(r_1 + \lambda_1)p + \lambda_4}{r_4} + n - m \right|^2 dx + \overline{C}_3, \qquad (3.9)$$

where $\overline{C}_3$ does not depend on $m$. For a fixed variable $n$ we use (2.7) to obtain the closed-form solution of (3.9):

$$\tilde{m}^1 = \text{proj}_R(z) \text{ where}$$

$$z \equiv \frac{(r_1 + \lambda_1)p + \lambda_4}{r_4} + n.$$

Since the first and second component of $p$, $n$, and $\lambda_4$ are defined at ○-nodes and □-nodes respectively, c.f. FIG. 2, a discretization of $z$ at $(i,j)\in$ ○-nodes is $$z_1(i, j) = n_1(i, j) + \frac{1}{r_4}\left(\lambda_{41}(i, j) + \left(\frac{\lambda_1(i+1, j) + \lambda_1(i, j)}{2} + r_1\right)p_1(i, j)\right)$$

$$z_2(i, j) = \mathcal{A}_{i,j}^\circ(n_2) + \frac{1}{r_4}\left(\mathcal{A}_{i,j}^\circ(\lambda_{42}) + \left(\frac{\lambda_1(i+1, j) + \lambda_1(i, j)}{2} + r_1\right)\mathcal{A}_{i,j}^\circ(p_2)\right)$$

A discretization of $z$ at $(i,j)\in$ □-nodes is similarly obtained with $\mathcal{A}_{i,j}^\square(\bullet)$:

$$z_1(i, j) = \mathcal{A}_{i,j}^\square(n_1) + \frac{1}{r_4}\left(\mathcal{A}_{i,j}^\square(\lambda_{41}) + \left(\frac{\lambda_1(i, j+1) + \lambda_1(i, j)}{2} + r_1\right)\mathcal{A}_{i,j}^\square(p_1)\right)$$

$$z_2(i, j) = n_2(i, j) + \frac{1}{r_4}\left(\lambda_{42}(i, j) + \left(\frac{\lambda_1(i, j+1) + \lambda_1(i, j)}{2} + r_1\right)p_2(i, j)\right)$$

3.2.4 Minimization of $\epsilon_4(p)$ in (2.18)

We denote fixed variables $\tilde{u}^1$, $\tilde{m}^1$, and $\tilde{n}^1$, as $u$, $m$, and $n$, respectively. It is easy to see that $\epsilon_4(p)$ in (2.18) can be written as $$\epsilon_4(p) = \int_\Omega (a + b(\nabla \cdot n)^2 + r_1 + \lambda_1)|p| + \qquad (3.11)$$

$$\frac{r_2}{2} \int_\Omega \left(p - \left(\nabla u + \left(\frac{r_1 + \lambda_1}{r_2}\right)m - \frac{\lambda_2}{r_2}\right)\right)^2 + \overline{C}_4$$

where $\overline{C}_4$ does not depend on p. Let $$c = a + b(\nabla \cdot n)^2 + r_1 + \lambda_1 \text{ and } q = \nabla u + \left(\frac{r_1 + \lambda_1}{r_2}\right)m - \frac{\lambda_2}{r_2}$$

Then, for fixed u, n and m, we apply the same approach in [25] to find the closed-form solution for the minimization of (3.11):

$$\tilde{p}^l(i, j) = \max\left\{0, 1 - \frac{c}{r_2|q(i, j)|}\right\}q(i, j). \tag{3.12}$$

According to the rule of indexing variables in FIG. 2, the first and second component of p, n, and $\lambda_2$ are defined at ○-nodes and □-nodes, respectively. Now, a discretization of c and q at (i,j)∈ ○-nodes is obtained as follows:

$$c(i, j) = a + r_1 + \frac{\lambda_1(i+1, j) + \lambda_1(i, j)}{2} + b\left(\frac{n_1(i+1, j) - n_1(i-1, j)}{2} + \frac{n_2(i+1, j) - n_2(i, j) - n_2(i+1, j-1) - n_2(i, j-1)}{2}\right)^2$$

$$q_1(i, j) = u(i+1, j) - u(i, j) + \left(\frac{r_1}{r_2} + \frac{1}{r_2}\left(\frac{\lambda_1(i+1, j) + \lambda_1(i, j)}{2}\right)\right)m_1(i, j) - \frac{1}{2}\lambda_{21}(i, j),$$

$$q_2(i, j) = \frac{1}{2}\left(\frac{u(i+1, j+1) + u(i, j+1)}{2} - \frac{u(i+1, j-1) + u(i, j-1)}{2}\right) + \left(\frac{r_1}{r_2} + \frac{1}{r_2}\left(\frac{\lambda_1(i+1, j) + \lambda_1(i, j)}{2}\right)\right)\mathcal{A}_{i,j}^\circ(m_2) - \frac{1}{r_2}\mathcal{A}_{i,j}^\circ(\lambda_{22}).$$

Similarly, a discretization of c and q at (i,j)∈ □-nodes is obtained as follows:

$$c(i, j) = a + r_1 + \frac{\lambda_1(i, j+1) + \lambda_1(i, j)}{2} + b\left(\frac{n_1(i, j+1) + n_1(i, j) - n_1(i-1, j+1) - n_1(i-1, j)}{2} + \frac{n_2(i, j+1) - n_2(i, j-1)}{2}\right)^2$$

$$q_1(i, j) = \frac{1}{2}\left(\frac{u(i+1, j+1) + u(i+1, j)}{2} - \frac{u(i-1, j+1) + u(i-1, j)}{2}\right) + \left(\frac{r_1}{r_2} + \frac{1}{r_2}\left(\frac{\lambda_1(i, j+1) + \lambda_1(i, j)}{2}\right)\right)\mathcal{A}_{i,j}^\square(m_1) - \frac{1}{r_2}\mathcal{A}_{i,j}^\square(\lambda_{21}).$$

$$q_2(i, j) = u(i, j+1) - u(i, j) + \left(\frac{r_1}{r_2} + \frac{1}{r_2}\left(\frac{\lambda_1(i, j+1) + \lambda_1(i, j)}{2}\right)\right)m_2(i, j) - \frac{1}{r_2}\lambda_{22}(i, j),$$

3.2.5 Minimization of $\epsilon_5(n)$ in (2.19)

We denote fixed variables $\tilde{p}^1$ and $\tilde{m}^1$ as p and m, respectively. The Euler-Lagrange equation of (2.19) is given by $$-2\nabla^+(b|p|\text{div}^-n) + r_4(n-m) + \lambda_4 = 0. \tag{3.13}$$

As a uniform grid is normally used for image processing, we shall employ a frozen coefficient method to solve the above linear equation for the purpose of easier implementations. For properly chosen c, we solve the following problem iteratively for q=1, 2, . . . :

$$-c\nabla^+(\text{div}^{31} n^q) + r_4 n^q = r_4 m - \lambda_4 - \nabla^+((c-2b|p|)\text{div}^- n^{q-1})$$

where the initial condition $n^{q=0} = \tilde{n}^{l-1}$ is the solution at the previous iteration of the loop. In our simulations, we choose c as $$c \equiv \max_{(i,j)\in \bullet\text{-nodes}}(2b|\mathcal{A}|_{i,j}^\bullet(p))$$

The coupled linear equations (3.14) are efficiently solved by the FFT. In the frequency domain, we have $N_1 N_2$ systems of two linear equations with two unknowns and the determinant of the coefficients matrix is not zero for all frequencies with a positive penalty constant $r_4$; see more details in [30]. If the sequence $n^q$ satisfies with $$\frac{\|n^q - n^{q-1}\|_{L1}}{\|n^{q-1}\|_{L1}} < \epsilon_n$$

we stop the iteration and update $\tilde{n}=n^q$. In the experiments presented below, $\epsilon_n = 10^{-3}$ is used for all numerical examples.

Now, we briefly give the details on how to solve the coupled linear equations (3.14). Using the notation in Section 3.1, the coupled equations (3.14) can be written as:

$$-c(\partial_1^+\partial_1^- n_1^q + \partial_1^+\partial_2^- n_2^q) + r_4 n_1^q = r_4 m_1 - \lambda_{41} - \partial_1^+((c-2b|p|\text{div}^- n^{q-1})) \tag{3.16}$$

$$-c(\partial_2^+\partial_1^- n_1^q + \partial_2^+\partial_2^- n_2^q) + r_4 n_2^q = r_4 m_2 - \lambda_{42} - \partial_2^+((c-2b|p|\text{div}^- n^{q-1}))$$

Using the shifting operators (3.16), the discretization at (i,j)∈ ○-nodes of the first equation in (3.16) is:

$$-c((S_1^- - 2J + S_1^+)n_1^q(i,j) + (S_1^+ - S_1^+ S_2^- - J + S_2^-)n_2^q(i,j)) + r_4 n_1^q(i,j) = f_1(i,j) \tag{3.17}$$

where $$f_1(i,j) = r_4 m_1(i,j) - \lambda_{41}(i,j) - (c-2b|\mathcal{A}|_{i+1,j}^*(p))\text{div}_{i+1,j}^*(n) + (c-2b|\mathcal{A}|_{i,j}(p))\text{div}_{i,j}^*(n)$$

Similarly, the second equation in (3.16) is discretized at (i,j)∈ □ nodes as:

$$-c((S_2^+ - J - S_1^- S_2^+ + S_1^-)n_1^q(i,j) + (S_2^- - 2J + S_2^+)n_2^q(i,j)) + r_4 n_2^q(i,j) = f_2(i,j) \tag{3.18}$$

where $$f_2(i,j) = r_4 m_2(i,j) - \lambda_{42}(i,j) - (c-2b|\mathcal{A}|_{i,j+1}^*(p))\text{div}_{i,j+1}^*(n) + (c-2b|\mathcal{A}|_{i,j}(p))\text{div}_{i,j}^*(n)$$

We apply the discrete Fourier transform to solve (3.17) and (3.18). Using the notations of discrete frequencies in (3.8), we have a system of linear equations:

$$\begin{pmatrix} a_{11} & a_{12} \\ a_{21} & a_{22} \end{pmatrix} \begin{pmatrix} Fn_1^q(y_i, y_j) \\ Fn_2^q(y_i, y_j) \end{pmatrix} = \begin{pmatrix} Ff_1(y_i, y_j) \\ Ff_2(y_i, y_j) \end{pmatrix}$$

where the coefficients are $$a_{11} = r_4 - 2c(\cos z_i - 1)$$

$$a_{12} = -c(1 - \cos z_j + \sqrt{-1}\sin z_j)(-1 + \cos z_i + \sqrt{-1}\sin z_i)$$

$$a_{21} = -c(1-\cos z_i + \sqrt{-1} \sin z_i)(-1+\cos z_j + \sqrt{-1} \sin z_j)$$

$$a_{22} = r_4 - 2c(\cos z_j - 1)$$

TABLE 1

Methods of solving subproblems (2.10)-(2.14)

| Subproblems | Related energy function | Method of solution |
|---|---|---|
| (2.10) | $\epsilon_1(v)$ | (3.4): closed form solution |
| (2.11) | $\epsilon_2(u)$ | (3.5): FFT of linear PDE |
| (2.12) | $\epsilon_3(m)$ | (3.10): closed-form solution |
| (2.13) | $\epsilon_4(p)$ | (3.12) closed-form solution |
| (2.14) | $\epsilon_5(n)$ | (3.14) FFT of coupled linear PDEs |

We have $N_1 N_2$ numbers of 2×2 systems. The determinant of the coefficient matrix $$D = r_4^2 - 2r_4 c(\cos z_i + \cos z_j - 2)$$

is always positive for all discrete frequencies if $r_4 > 0$. After the systems of linear equations are solved for each frequency, we use the discrete inverse Fourier transform to obtain $n^q = (n_1^q, n_2^q)$:

$$n_1^q = \mathcal{R}\left(\mathcal{F}^{-1}\left(\frac{a_{22}\mathcal{F}f_1 - a_{12}\mathcal{F}f_2}{D}\right)\right) \text{ and}$$

$$n_2^q = \mathcal{R}\left(\mathcal{F}^{-1}\left(\frac{-a_{21}\mathcal{F}f_1 + a_{11}\mathcal{F}f_2}{D}\right)\right)$$

where $\mathcal{R}(\bullet)$ is the real part of a complex number.

For clarity, we summarize the methods for the sub-minimization problems in Table 1. All subproblems can be efficiently solved with very low computational costs.

3.3 Update Lagrange Multipliers

After the variables $v^k, u^k, m^k, p^k$, and $n^k$ in (2.9) are updated by the algorithm in step 2 of section 2 above (i.e. substeps 2.1 to 2.3), we update Lagrange multipliers $\lambda_1^k, \lambda_2^k, \lambda_3^k$ and $\lambda_4^k$ according to the algorithm in step 3 of section 2. Using the staggered grid as shown in FIG. 2, the discretized form for the equations from (2.20) to (2.23) is written as:

$$\lambda_1^k = \lambda_1^{k-1} + r_1(|\mathcal{A}|_{i,j}(p^k) - m^k \cdot p^k) \text{ at } \bullet\text{-node,}$$

$$\lambda_{21}^k = \lambda_{21}^{k-1} + r_2(p_1^k - \partial_1^+ u^k) \text{ at } \bigcirc\text{-node,}$$

$$\lambda_{22}^k = \lambda_{22}^{k-1} + r_2(p_2^k - \partial_2^+ u^k) \text{ at } \square\text{-node,}$$

$$\lambda_3^k = \lambda_3^{k-1} + r_3(v^k - v^k) \text{ at } \bullet\text{-node,}$$

$$\lambda_{41}^k = \lambda_{41}^{k-1} + r_4(n_1^k - m_1^k) \text{ at } \bigcirc\text{-node,}$$

$$\lambda_{42}^k = \lambda_{42}^{k-1} + r_4(n_2^k - m_2^k) \text{ at } \square\text{-node,}$$

We use average of vectors to approximate $m^k \cdot p^k$ at $\bullet$-nodes:

$$p^k(i,j) = \left(\frac{p_1^k(i,j) + p_1^k(i-1,j)}{2}, \frac{p_2^k(i,j) + p_2^k(i,j-1)}{2}\right),$$

$$m^k(i,j) = \left(\frac{n_1^k(i,j) + n_1^k(i-1,j)}{2}, \frac{n_2^k(i,j) + n_2^k(i,j-1)}{2}\right).$$

When the residual $R_1^k = |p^k| - m^k \cdot p^k$ is close to machine precision, it may cause numerical instabilities because we do not use $L^2$ penalization for the term multiplied by $r_1$ in the proposed augmented Lagrangian method (2.8). In order to reduce such instabilities, we update $\lambda_1^k(i,j) = (i,j)$ if $R_1^k(i,j) < 10^{-12}$

4. Numerical Examples

In this section, we present numerical examples using the proposed algorithm in image inpainting, image denoising, and image zooming. The test system is a Intel® Core™ i7 CPU Q720 1.6 GHz with 4 GB RAM.

During the iterations, we always monitor the residuals defined by:

$$(\tilde{R}_1^k, \tilde{R}_2^k, \tilde{R}_3^k, \tilde{R}_4^k) = (|p^k| - m^k \cdot p^k, p^k - \nabla u^k, u^k, n^k - m^k).$$

Since the residuals do not explicitly depend on the choice of penalty parameters $r_1, r_2, r_3$, and $r_4$, it is reasonable to stop the iteration if the relative residuals are smaller than $\epsilon_r$, that is, $$R_i^k \equiv \frac{1}{|\Omega|} \|\tilde{R}_i^k\|_{L^1} < \epsilon_r, \forall i \in \{1, 2, 3, 4\}, \quad (4.1)$$

where $\|\bullet\|_{L^1}$ is the $L^1$ norm on $\Omega$ and $|\Omega|$ is the area of the domain $\Omega$. In all our numerical experiments except the computational time comparison test, we use (4.1) as our stopping criterion. We also monitor the relative errors of Lagrange multipliers:

$$(L_1^k, L_2^k, L_3^k, L_4^k) = \quad (4.2)$$

$$\left(\frac{\|\lambda_1^k - \lambda_1^{k-1}\|_{L^1}}{\|\lambda_1^{k-1}\|_{L^1}}, \frac{\|\lambda_2^k - \lambda_2^{k-1}\|_{L^1}}{\|\lambda_2^{k-1}\|_{L^1}}, \frac{\|\lambda_3^k - \lambda_3^{k-1}\|_{L^1}}{\|\lambda_3^{k-1}\|_{L^1}}, \frac{\|\lambda_4^k - \lambda_4^{k-1}\|_{L^1}}{\|\lambda_4^{k-1}\|_{L^1}}\right)$$

the relative error of the solution $\{u^k | k=1, 2, \ldots\}$ $$\frac{\|u^k - u^{k-1}\|_{L^1}}{\|u^{k-1}\|_{L^1}}, \quad (4.3)$$

and the numerical energy $$E^k = \int_\Omega (a + b(\nabla \cdot n^k)^2)|p^k| + \frac{\eta}{s}\int_\Gamma |v^k - u_0|^s \quad (4.4)$$

All quantities are plotted in log scale except the x-axis for the numerical energy (4.4) and SNR (4.6).

The variation of the residuals as well as the relative errors and energy will give us important information about the convergence of the iterations. While we show numerical results obtained at the iteration when the stopping criterion is met, all graphs related to the proposed algorithm are drawn up to 1000 iterations. Before we show our numerical results, we give some remarks on choosing tuning parameters. There are three parameters coming from the elastica energy and data fitting term: a, b, and $\eta$. The ratio between a and b has to do with the connectivity and smoothness of the level lines: larger b encourages the connection of disconnected level lines and smoother level lines; see also [10]. The parameter $\eta$ depends on how close we want u to be $u_0$. In image inpainting, we need u to be as close to $u_0$ on $\Omega \backslash \Gamma$ as possible. So we choose a large value for $\eta$. In image denoising, we tune $\eta$ according to the amount of noise found in image: the noisier $u_0$ is, the smaller value we choose for $\eta$. We also have the parameters associated with Lagrange multipliers: $r_1, r_2, r_3$ and $r_4$. In order to reduce the number of parameters to tune, we set $r_1 = 1$ for our numerical experiments. To understand the role of the parameters $r_2$ and $r_3$, we go to the equation (3.5). The parameter $r_2$ controls the amount of diffusion of u: the larger $r_2$ is, the more diffusion u has. The parameters $r_3$ and $r_4$ control the closeness between v and u and n and m, respectively. While using these as a guideline, we tried to keep the same parameters whenever possible. In particular, our results for the images corrupted by Gaussian noise were obtained using the same parameters. Therefore, we can say that the number of parameters associated with our algorithm is not too much of concern.

4.1 Image Inpainting

In this subsection, we illustrate the efficiency of the embodiment via many examples of image inpainting. The process of restoring missing or damaged areas in digital images is known as image inpainting or image interpolation. Interesting applications of digital inpainting are explored in [31], where the term "image inpainting" was introduced. Numerous approaches to image inpainting have been proposed in literature: an axiomatic approach to image interpolation [32], a variational geometric approach [8-10. 33-39], inpainting by vector fields and gray levels [11, 40], simultaneous structure and texture image inpainting [41], wavelet and framelet based image inpainting [42, 43], examplar-based inpainting methods [44-47], exemplar-based inpainting method with a geometric guide [48], analytical modeling of exemplar-based inpainting method [49], reformulation of the problem of region-segmentation with curvature regularity as an integer linear program (ILP) [50], and graph cut formulation of the elastica model [51, 52].

In FIGS. 3, 5, 6 and 7 (explained below) the inpainting domain D is always shown in a light shaded color. The integration domain $\Gamma$ in the energy functional (2.1) is $\Omega\backslash\Gamma$. The proposed (ALM) algorithm in section 2 can be applied for s=1 or 2 in (2.1). We use s=1 for all examples in image inpainting. As mentioned above, in a variation of the embodiment an augmented Lagrangian can be used to solve image inpainting model (2.2). Recently, some fast algorithms to minimize curvature have been proposed in image segmentation [51] and image inpainting [50, 52].

First of all, the computational time (sec) of the proposed algorithm (ALM) is compared with the numerical algorithm (CKS) in [10] for image inpainting. Whereas the algorithm (CKS) involves a time step, our algorithm is free of a time step. For a fair comparison, we stop the iteration if the relative error of the solution $\{u^k|k=1, 2, \ldots\}$ satisfies $$\frac{1}{|\Omega|}\|u^k - u^{k-1}\|_{L1} < \epsilon_d \quad (4.5)$$

Figure 3:
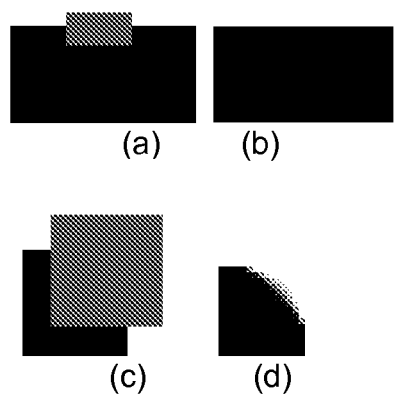

FIGS. 3(*a*) and 3(*c*) show the task set for the embodiment. The lighter shaded regions in FIGS. 3(*a*) and (*c*) are inpainting domains, where the black and white areas are the areas of the domain other than the inpainting domain (i.e. the black and white areas are the uncorrupted portion of the original image). FIGS. 3(*b*) and (*d*) are the corresponding results from the proposed algorithm.

We use $\epsilon_d=10^{-5}$ for the example of FIG. 3(*a*) and $\epsilon_d=2\times 10^{-6}$ for the example of FIG. 3(*c*). Since we only have two projection steps and two linear PDEs in the sub-problems, the proposed algorithm takes very low computational cost. Comparing with CKS, the proposed algorithm is approximately thousands times faster in computational time. The constants a=1, b=20, and $\eta=5\times 10^2$ are used for FIG. 3(*a*) and FIG. 3(*c*) in ALM and CKS. In FIG. 3(*a*), the penalty parameters in our algorithm are $r_1=1$, $r_2=r_3=10$, and $r_4=50$. For the algorithm in CKS, the time step $10^{-5}$ is used. For FIG. 3(*c*), the penalty parameters in our algorithm are $r_1=1$, $r_2=400$ and $r_3=r_4=100$. For the algorithm in CKS, the time step $10^{-4}$ is used.

Figure 4A:
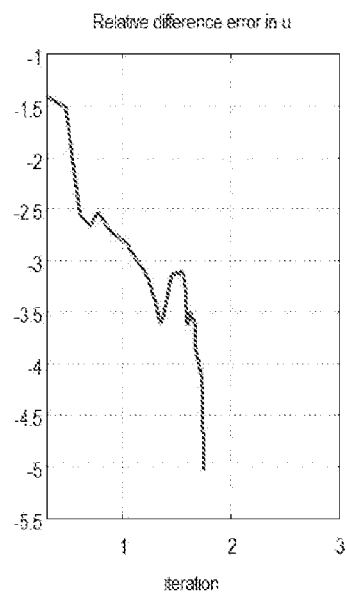
FIG. 4 is composed of FIGS. 4(a)-(h), and shows the evolution of errors and energy values during the operation of the embodiment and in a comparative example.
Figure 4B:
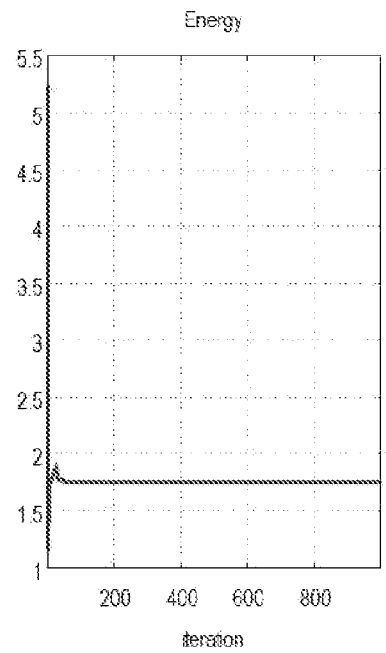
Figure 4C:
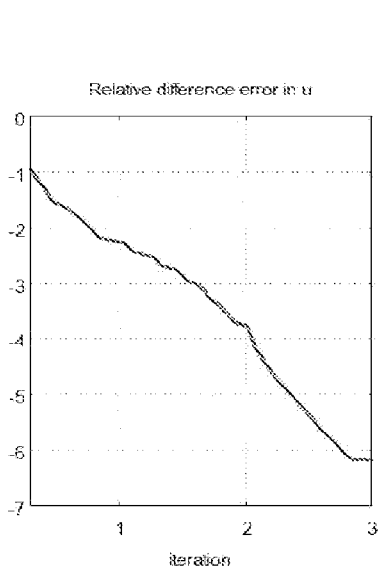
Figure 4D:
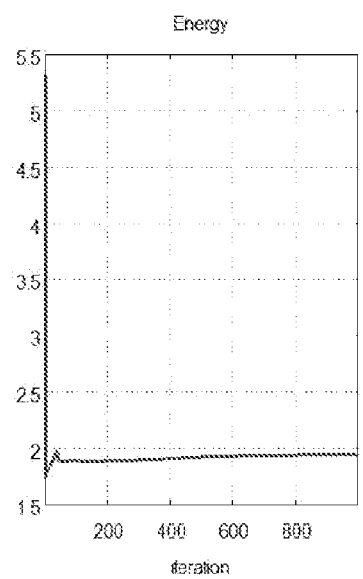
Figure 4:
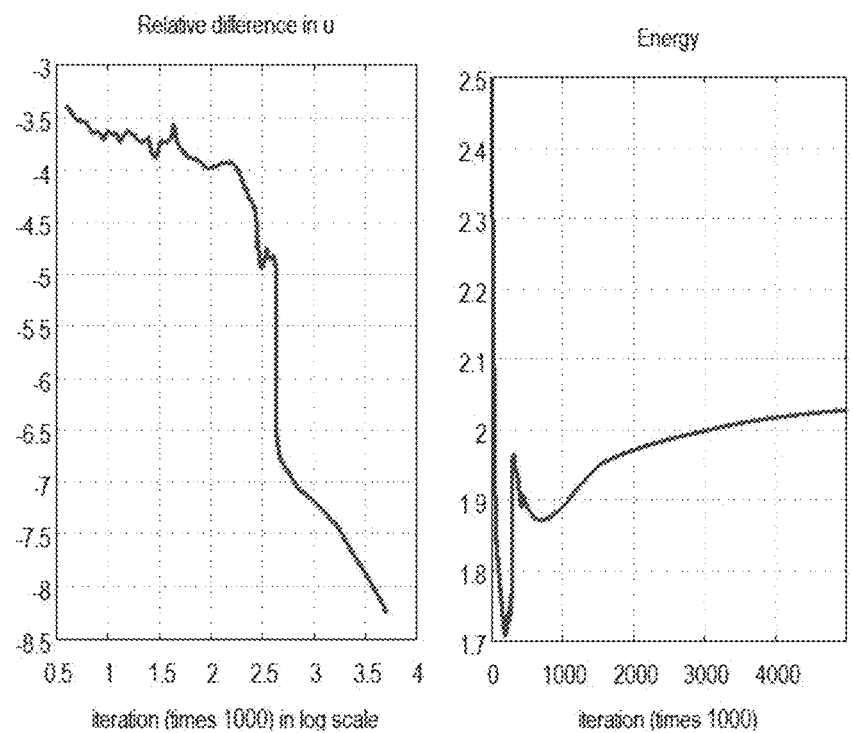
Figure 4:
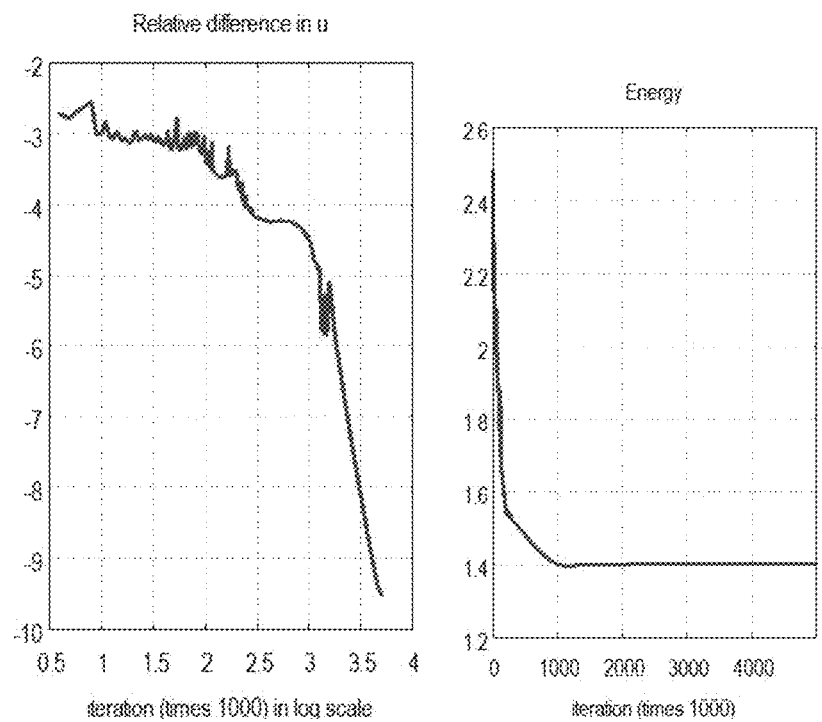

FIG. 4(*a*)-(*d*) show plots of relative errors ("relative difference") of $u_k$ (FIGS. 4(*a*) and 4(*c*)) and energy (FIGS. 4(*b*) and 4(*d*)) using the embodiment, whereas FIGS. 4(*e*)-(*f*) show plots of relative errors (FIGS. 4(*e*) and FIG. 4(*g*)) and energy (FIGS. 4(*f*) and FIG. 4(*h*)) using a comparative example (the CKS algorithm of [10]). FIGS. 4(*a*)-(*b*) and FIGS. 4(*e*)-(*f*) are for example FIG. 3(*a*), and FIGS. 4(*c*)-(*d*) and 4(*g*)-(*h*) are for example FIG. 3(*c*).

Since the relative difference in FIG. 4(*a*) is almost zero after 55 iterations, we do not plot the relative difference afterwards. Apart from this, as we mentioned at the beginning of Section 4, all graphs related to our algorithm are drawn up to 1000 iterations. By doing so, we can easily observe the convergence of our algorithm. In the case of the algorithm in CKS, it involves a time step, so more iteration numbers are needed to see its convergence. From this test, we can see that our algorithm takes very few iterations to converge compared with the CKS method. The two algorithms produce similar inpainting results.

In Table 2 we show the computational time (sec) of our proposed (ALM) algorithm compared with the method (CKS) in [10].

TABLE 2

|   | size | unknowns | ALM # of iteration | ALM time (sec) | CKS # of iteration | CKS time (sec) |
|---|---|---|---|---|---|---|
| (a) | 28 × 28 | 50 | 55 | 0.177 | 427000 | −412.043 |
| (b) | 28 × 28 | 256 | 432 | 0.807 | 1301000 | 1397.371 |

Figure 5:
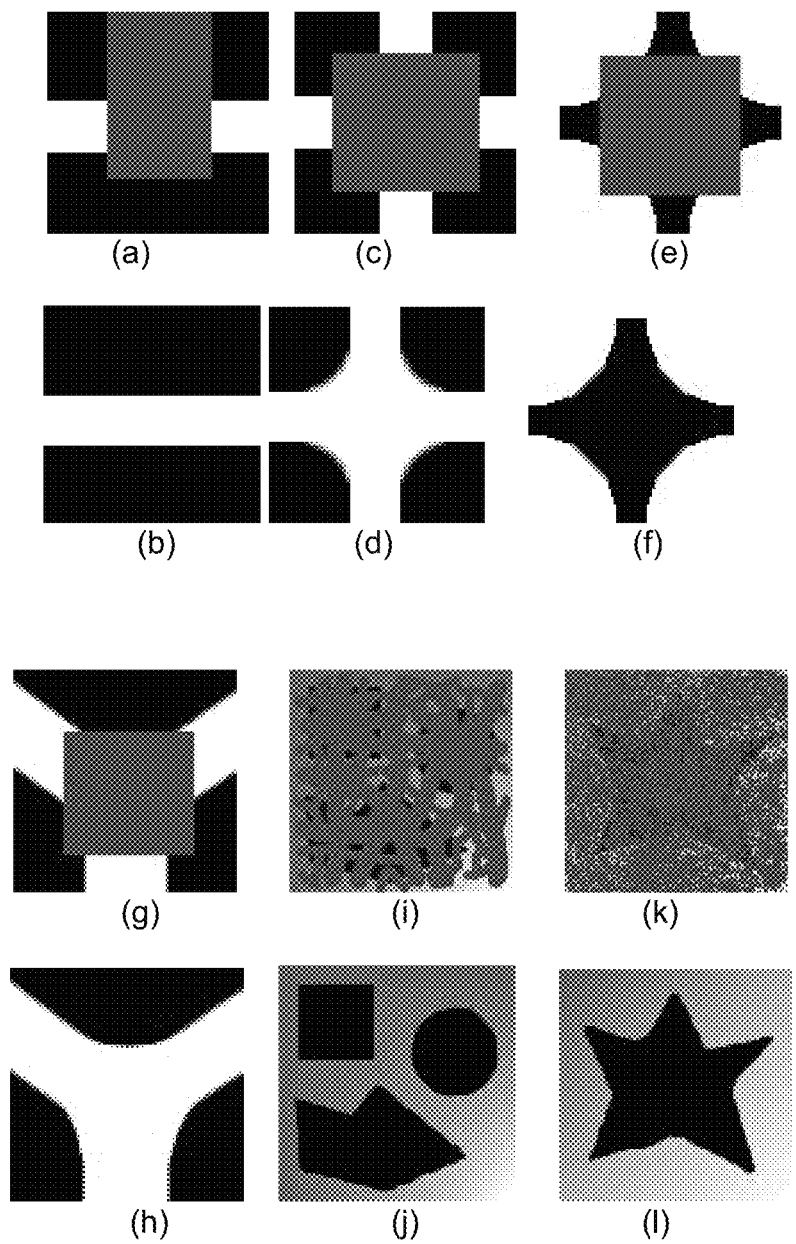
FIG. 5 is composed of FIGS. 5(a)-5(l), of which FIGS. 5(a), (c), (e), (g), (i), and (k) illustrate problems addressed by the embodiment, and FIGS. 5(b), (d), (f), (h), (j), and (l) illustrate the results.

FIG. 5 shows inpainting results for some synthetic images. The light-shaded regions of FIGS. 5(*a*), (*c*), (*e*), (*g*), (*i*), (*k*) are inpainting domains. The domains of FIGS. 5(*a*), (*c*), (*e*), (*g*), (*i*), (*k*) other than the inpainting regions are again indicated by the black and white areas. FIGS. 5(*b*), (*d*), (*f*), (*h*), (*j*) and (*l*) are the corresponding results based on Euler's elastica functional minimization.

As we expect, the Euler's elastica energy shows a property of long connectivity in FIG. 5(*b*). If the total variation is used, that is, b=0 in (2.1), the inpainting region in FIG. 5(*b*) will be filled as black color because the width of the inpainting region is thicker than the height of horizontal white bar. From the other synthetic examples, we observe that the curvature term gives smooth connection along the level curves of images on the inpainting domains.

In FIGS. 5(*i*) and 5(*k*), we intentionally use complicated shapes for the inpainting domains. Even though the portion of unknown pixels is 69.96% in FIGS. 5(*i*) and 84.96% in FIG. 5(*k*), the Euler's elastica energy recovers the main shapes in FIGS. 5(*j*) and 5(*l*) very well. We use $r_1=1$ and $\eta=10^3$ and a=1 and b=20 for all examples in FIG. 5 except 5-(*b*). The parameters used were: FIG. 5(*a*): a=0.1, b=1, $r_2=1$, $r_4=600$, $\epsilon_r=0.012$; FIG. 5(*c*) $r_2=300$, $r_3=100$, $r_4=600$, $\epsilon_r=0.001$; FIG. 5(*e*) $r_2=200=200$, $r_4=500$, $\epsilon_r=0.002$; FIG. 5(*g*) $r_2=200$, $r_3=10$, $r_4=100$, $\epsilon_r=0.0007$; FIG. 5(*i*) $r_2=50$, $r_4=500$, $\epsilon_r=0.005$; and FIG. 5(*k*) $r_2=50$, $r_3=100$, $r_4=500$, $\epsilon_r=0.005$.

Figure 6:
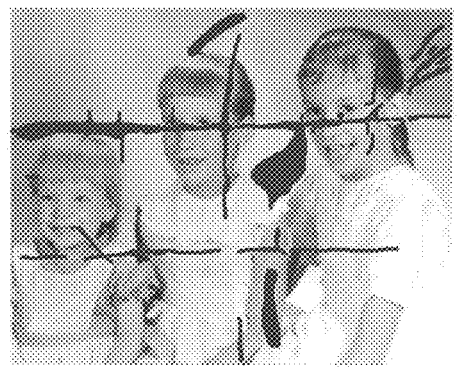
Figure 6:
Figure 7:
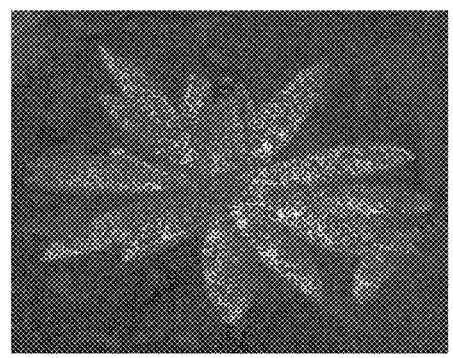
Figure 7:
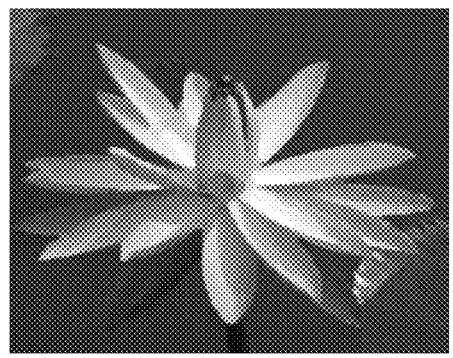
Figures 8A, 8B:
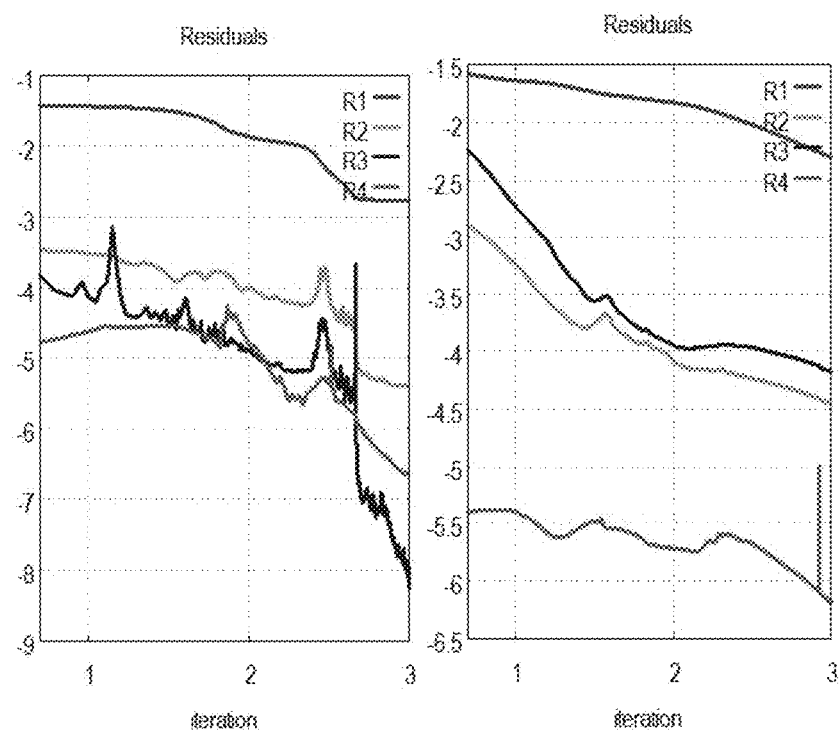
FIG. 8 is composed of FIGS. 8(a)-(h), and shows the evolution of relative residuals, relative errors in Lagrange multipliers, relative errors, and energy during the operation of the embodiment.
Figure 8C:
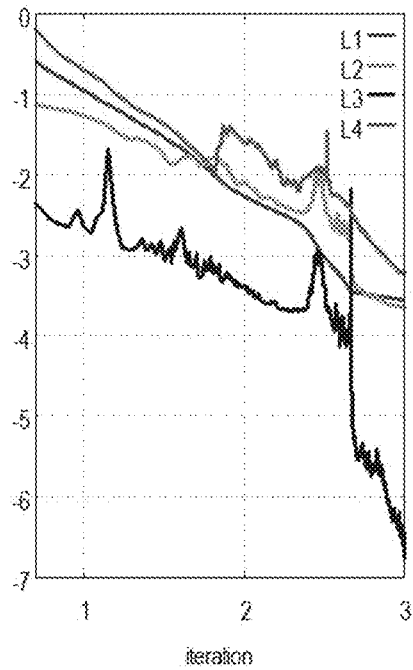
Figure 8D:
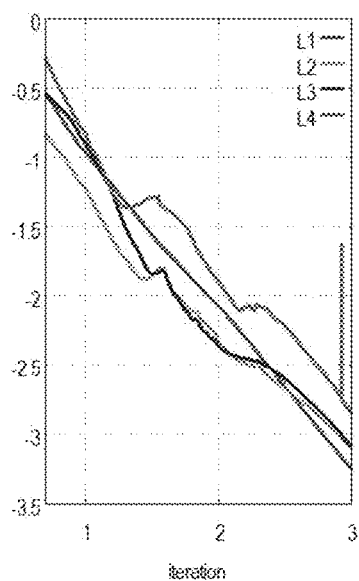
Figure 8E:
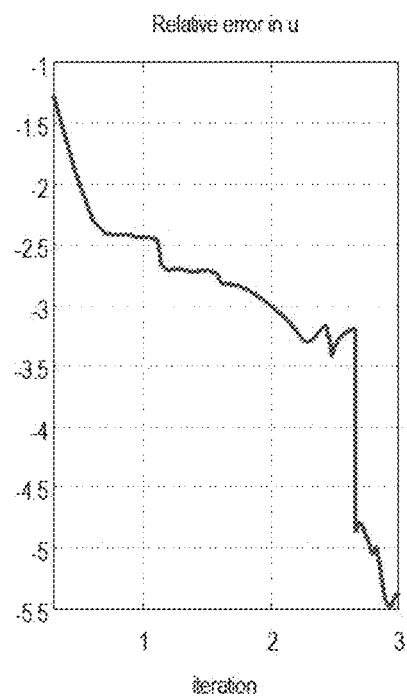
Figure 8F:
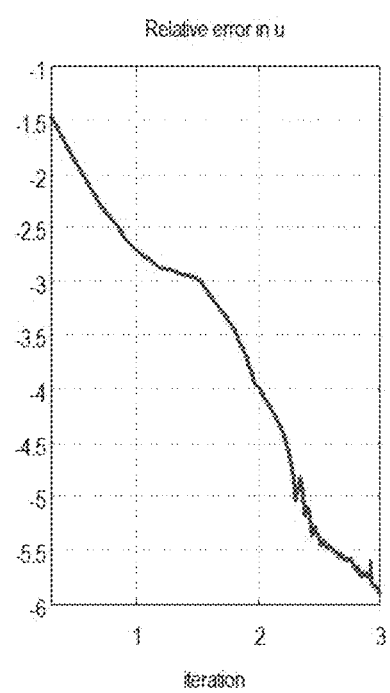
Figure 8G:
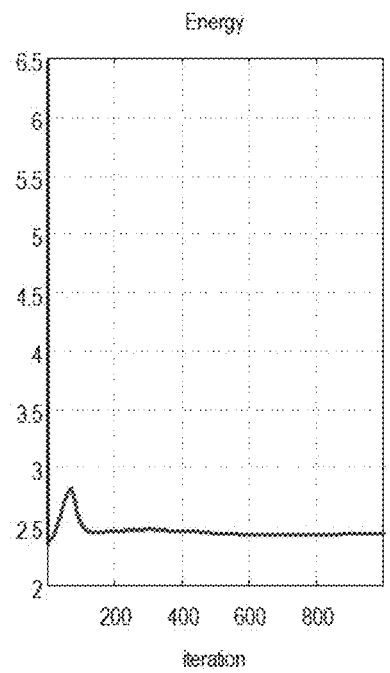
Figure 8H:
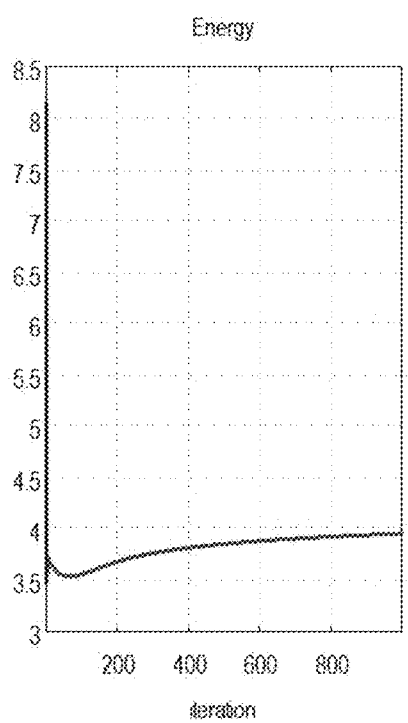

In FIGS. 6 and 7, we show the results of real image inpainting. FIG. 6(*a*) is a degraded image, and FIG. 7(*a*) is a corrupted image. The reconstructions are shown in FIGS. 6(*b*) and 7(*b*) respectively, based on Euler's elastica functional minimization. The reconstructions used the same tuning parameters except the error bound $\epsilon_r$. Specifically, these parameters were a=1, b=20, η=1000, $r_1$=1, $r_2$=200, $r_3$=100, $r_4$=300 and $\epsilon_r$=0.008.

FIG. 8 illustrates the relative residuals (4.1), relative errors of Lagrange multipliers (4.2), relative error of $u^k$ (4.3), and numerical energy (4.4) for each iteration k (i.e. the outer iteration). The graphs in FIGS. 8(a), (c), (e) and (g) are from the production of FIG. 5(f), and the graphs in FIGS. 8(b), (d), (f) and (h) are from the production of FIG. 6(b) respectively. The graphs for the other examples in FIGS. 5, 6 and 7 have similar profiles. Even though the graphs are not monotonically decreasing, the values are stable and steady after a few iterations. In early stages of the outer iteration, the increasing profile in the numerical energy is reasonable because all variables $v^k$, $u^k$, $m^k$, $p^k$, and $n^k$ are initially zero. Since 17 is large in image inpainting, the fidelity term in $E^k$ (4.4) dramatically tends to zero in a few iterations. Starting with the zero values of the variables, the regularity term in $E^k$ increases, but becomes steady after some iterations. From these plots, it is easy to see that the algorithm of the embodiment has converged before 1000 iterations. The plots of the residuals $R^k_i$ also gives important information about the choosing and tuning of the parameters $r_i$. With a bigger $r_i$, the residual $R^L_i$ will converge to zero faster. It is better to choose the parameters $r_1$ to make the residuals $R^k_i$ converge to zero at a similar rate.

TABLE 3

| Image | Size | Unknowns | Number of iterations | Time (seconds) | Percentage of unknown pixels |
|---|---|---|---|---|---|
| FIG. 5(b) | 52 × 52 | 936 | 403 | 2.527 | 34.62% |
| FIG. 5(d) | 52 × 52 | 1088 | 333 | 2.200 | 40.24% |
| FIG. 5(f) | 80 × 80 | 2500 | 449 | 6.568 | 39.06% |
| FIG. 5(h) | 80 × 80 | 2024 | 352 | 5.319 | 31.63% |
| FIG. 5(j) | 100 × 100 | 6996 | 307 | 7.753 | 69.96% |
| FIG. 5(l) | 100 × 100 | 8496 | 278 | 6.927 | 84.96% |
| FIG. 6(b) | 484 × 404 | 14258 | 443 | 298.611 | 7.29% |
| FIG. 7(b) | 300 × 325 | 42114 | 329 | 80.641 | 59.74% |

Table 3 shows the number of unknowns in the inpainting domains in FIGS. 5, 6 and 7. It also shows the computational time of the embodiment, measured in seconds. The "number of iterations" in Table 3 corresponds to the number of total outer iterations given in Table 2. If the size of inpainting domain is much smaller than the size of image, one may obtain better computational efficiency using the energy functional (2.2). However, there are some advantages to use the functional (2.1) in image inpainting, since it is very flexible for different inpainting domains. Since we have to use the boundary conditions for the image gradient in the model (2.2), it cannot be applied to inpainting domains whose boundary encloses two or three isolated pixels, such as inpainting regions in FIG. 5(k) and FIG. 7(a). Comparing the computational time to produce FIGS. 5(j) and 5(l), we have a better performance on FIG. 5(k), even though the missing parts in FIG. 5(i) are much smaller. It usually takes more time to obtain an inpainted result from the model (2.2) if the inpainting domain is wider.

4.2 Image Denoising

In this section, we illustrate results of the embodiment performing image denoising. A graph cuts algorithm to minimize Euler's elastica energy has recently been proposed for image denoising in [52]. In this subsection, we use s=1 and 2 in (2.1) for Gaussian white noise and salt-and-pepper noise, respectively. In image denoising, Γ in (2.1) is the same as the domain of image Ω. The embodiment can be also be applied to Poisson-type noise following [25].

Figure 9:
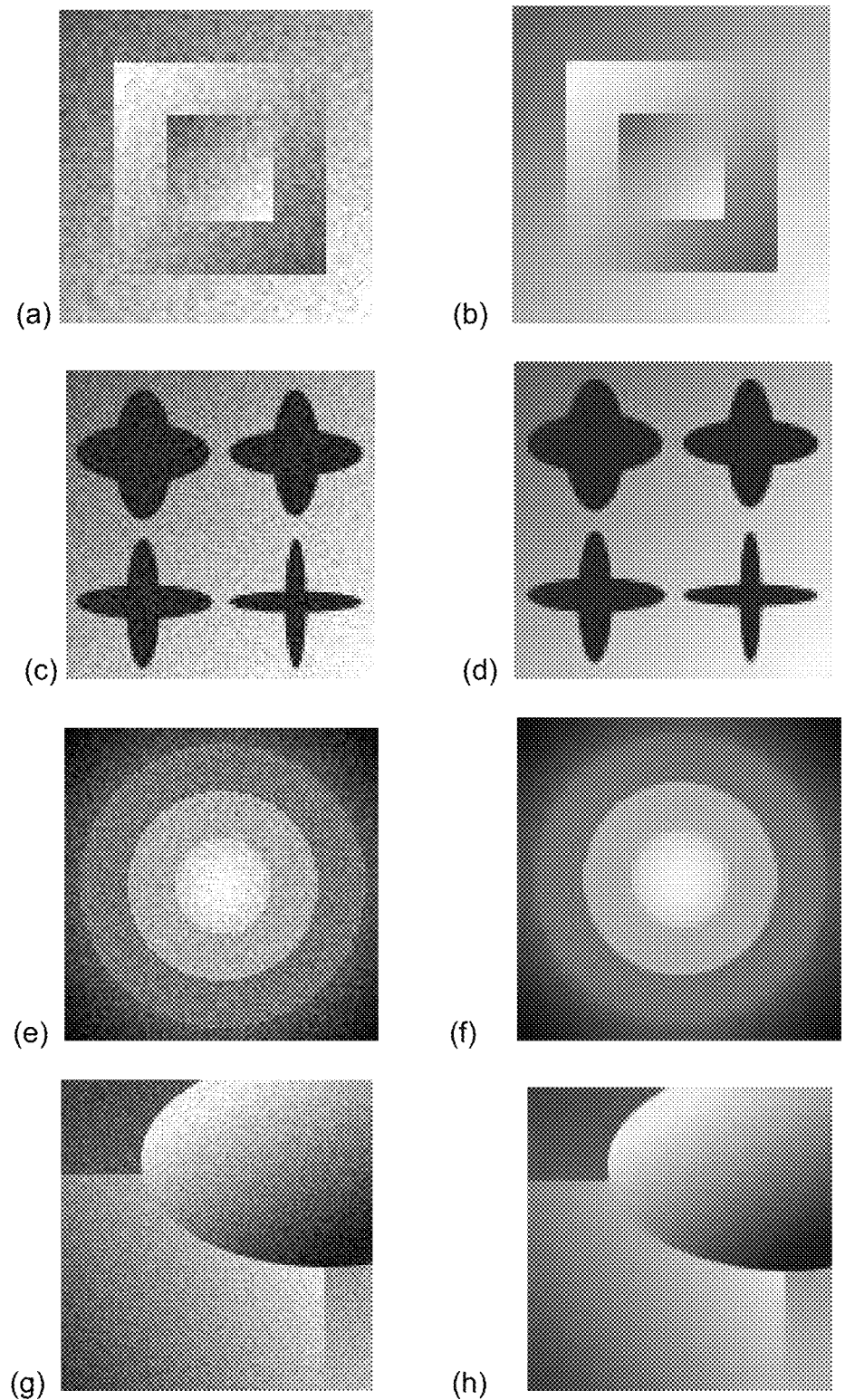
FIG. 9 is composed of FIGS. 9(a)-9(h), of which FIGS. 9(a), (c), (e), and (g) illustrate problems addressed by the embodiment, and FIGS. 9(b), (d), (f), and (h) illustrate the results.

FIG. 9 shows some results produced using the embodiment of Euler's elastica based image denoising for some synthetic images. FIGS. 9(a), (c), (e) and (g) are the noisy images, and FIGS. 9(b), (d), (f) and (h) are the restored images. Gaussian white noise with zero mean and the standard deviation 10 are used for all test images. For all examples, we use a=1, b=10, η=100, $r_1$=1, $r_2$=200, and $r_4$=500. The remaining parameter $\epsilon_r$ is 0.013 to produce FIG. 9(b), 0.007 to produce FIG. 9(d), 0.01 to produce FIGS. 9(f), and 0.008 to produce FIG. 9(h). The image in FIG. 9(g) is taken from [53]. The test image in FIG. 9(e) seems to be first used in [54]. According to the Euler's elastica energy, denoised images have smooth connections in the level curves of images. Moreover, the total variation preserves jump discontinuities in images. Some very nice analysis of these properties is given in [55].

Figure 10:
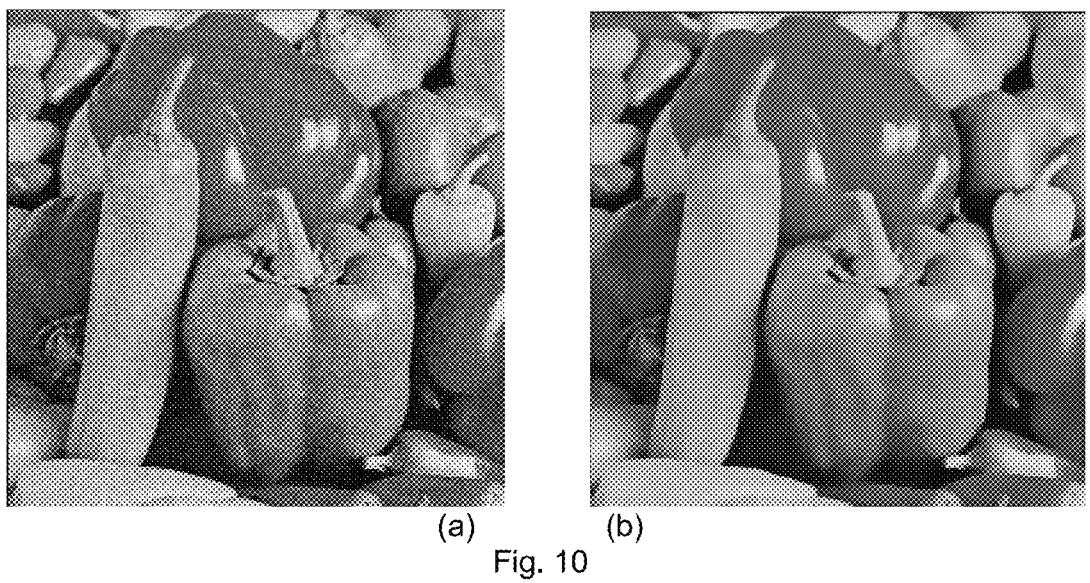
Figure 11:
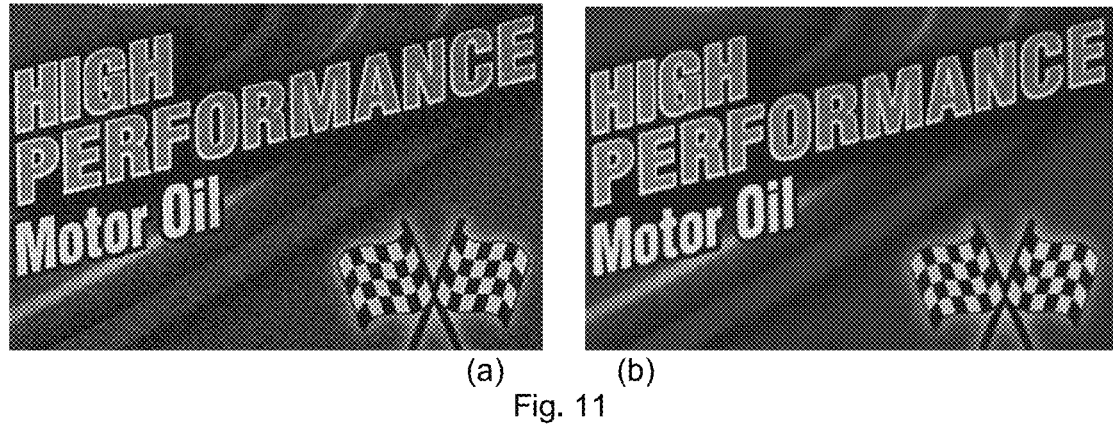
Figure 12A:
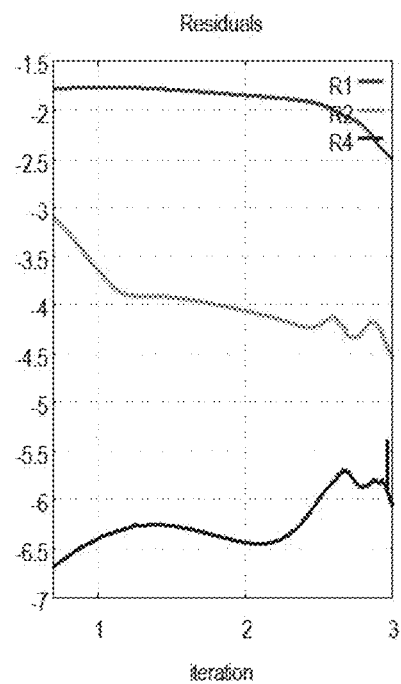
FIG. 12 is composed of FIGS. 12(a)-(j), and shows the evolution of relative residuals, relative errors in Lagrange multipliers, relative errors, energy, and SNR during the operation of the embodiment.
Figure 12B:
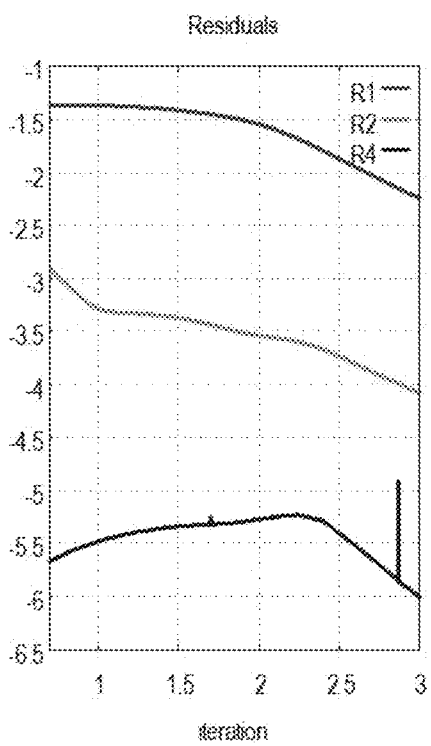
Figure 12C:
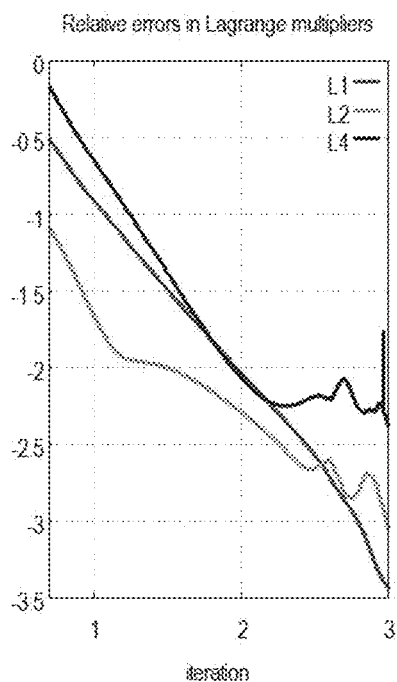
Figure 12D:
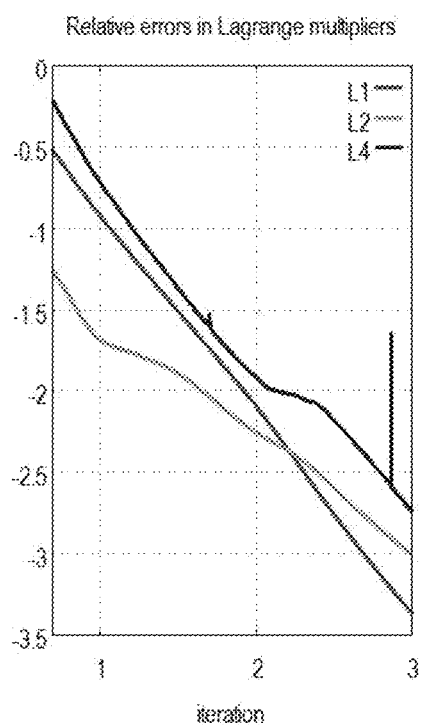
Figure 12E:
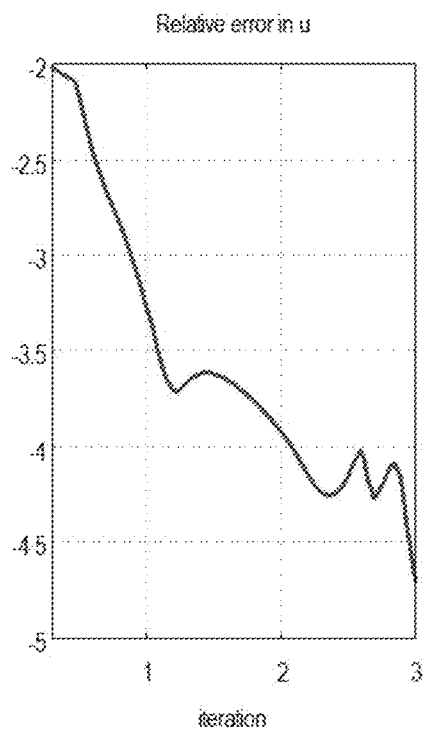
Figure 12F:
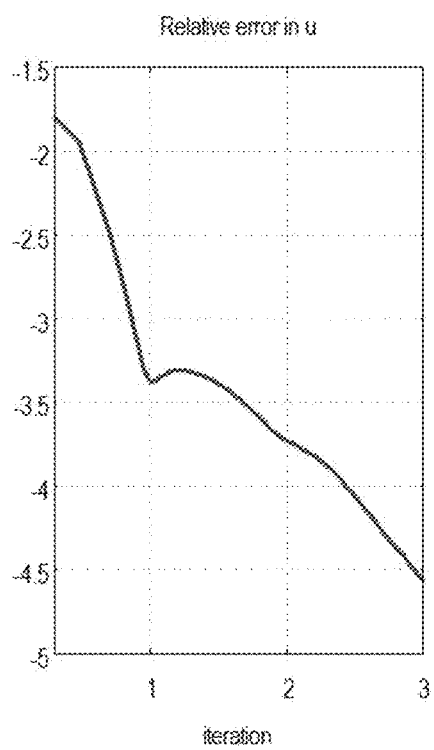
Figure 12G:
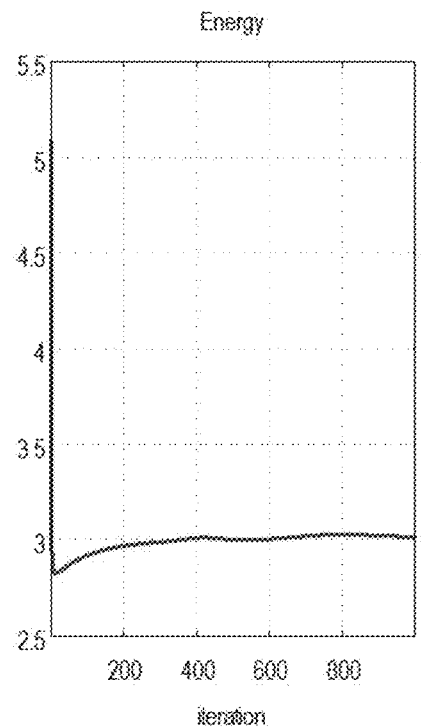
Figure 12H:
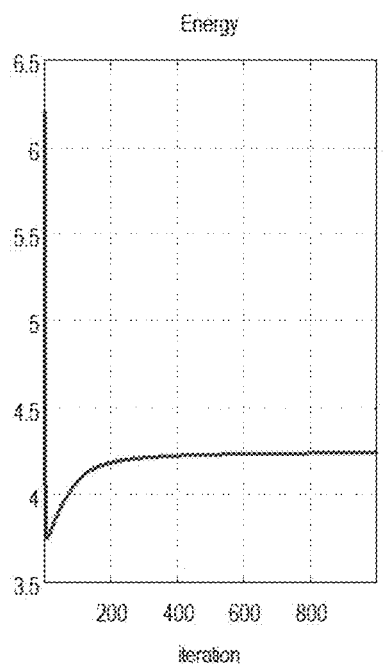
Figure 12I:
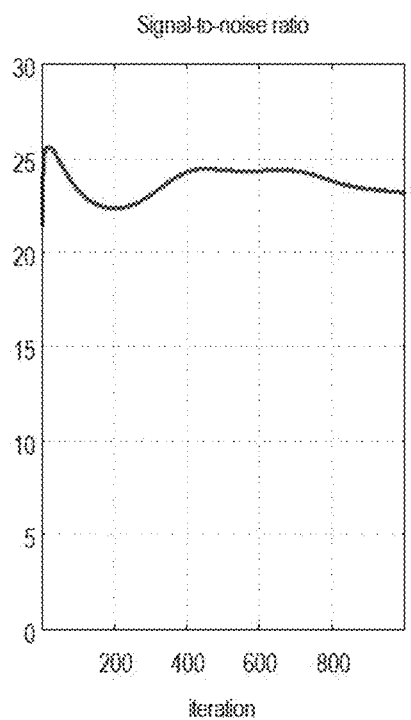
Figure 12J:
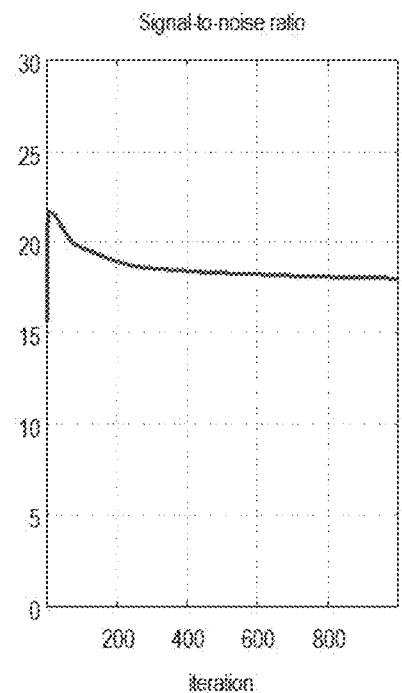

FIGS. 10 and 11 show some results from real images. FIGS. 10(a) and 11(a) are the noisy images, and FIGS. 10(b) and 11(b) show the results produced by the embodiment. The noisy images have Gaussian white noise with zero mean and the standard deviation 10. For all examples, we use a=1, b=10, 77=200, $r_1$=1, $r_2$=100, $r_4$=500 and $\epsilon_r$=0.015. Note that we do not need to use the extra variable v and the Lagrange multiplier $\lambda_3$ in the functional (2.8) for this case where s=2.

The augmented Lagrangian is then just:

$$\mathcal{L}(v, u, m, p, n; \lambda_1, \lambda_2, \lambda_3, \lambda_4) = \int_\Omega (a + b(\nabla \cdot n)^2)|p| + \frac{\eta}{s}\int_\Gamma |u - u_o|^s +$$

$$r_1 \int_\Omega (|p| - m \cdot p) + \int_\Omega \lambda_1(|p| - m \cdot p) + \frac{r_2}{2}\int_\Omega |p - \nabla u|^2 +$$

$$\int_\Omega \lambda_2 \cdot (p - \nabla u) + \frac{r_4}{2}\int_\Omega |n - m|^2 + \int_\Omega \lambda_4 \cdot (n - m) + \delta_R(m)$$

Table 4 gives the size of images in FIGS. 9, 10 and 11, the SNR, the number of outer iterations k and the computational time measured in seconds. The signal-to-noise ratio (SNR) is defined as $$10\log_{10}\left(\frac{\sum_{i,j}(u^k(i,j) - a_1)^2}{\sum_{i,j}(|u^k(i,j) - u_c(i,j)| - a_2)^2}\right) \quad (4.6)$$

where $u_c$ is an original image and $a_1$ and $a_2$ are average of $u^k$ and $u^k - u_c$, respectively. Since the proposed algorithm consists of simple loops and discrete Fourier transforms, the speed of computation can be accelerated by parallel programming. Specially, we address that the computational time is easily reduced several times via CUDA based programming. In our numerical experiment with GeForce 9600M GT, we approximately obtain four times faster computation.

TABLE 4

| Image | Size | SNR | Number of iterations | Time (seconds) |
|---|---|---|---|---|
| FIG. 9(b) | 60 × 60 | 21.96 | 314 | 3.366 |
| FIG. 9(d) | 100 × 100 | 27.74 | 283 | 7.056 |
| FIG. 9(f) | 100 × 100 | 24.28 | 402 | 11.598 |
| FIG. 9(h) | 128 × 128 | 16.15 | 290 | 13.434 |
| FIG. 10(b) | 256 × 256 | 18.62 | 274 | 55.369 |
| FIG. 11(b) | 332 × 216 | 17.24 | 272 | 77.410 |

The plots of FIG. 12(a)-(j) show the relative residuals (4.1), relative errors of Lagrange multipliers (4.2), relative error in $u^k$ (4.3), numerical energy (4.4), and SNR (4.6) versus the outer iteration k. The plots in FIGS. 12(a), (c), (e), (g) and (i) are from the example of FIG. 9(d), and the plots of FIGS. 12(b), (d), (f), (h) and (j) are from the example of FIG. 10(b). The plots of the other examples in FIGS. 9 and 11 have similar profiles. Since the Euler's elastica energy functional is not convex, we cannot expect monotonic decrease in the values of the energy, relative residuals, and relative errors of Lagrange multipliers. From these plots, we can see that the algorithm is stable, and energy and SNR have converged to a steady state. It is important that the residuals $R^k_i$ converge to zero with similar rate for different i. It is also clear that the energy and SNR have converged to a steady state.

Figure 13:
Figure 13:
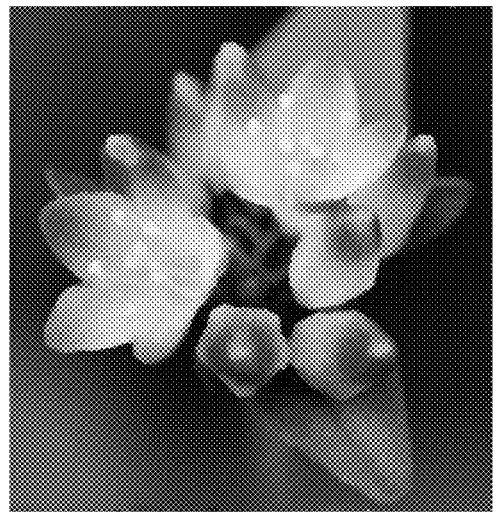
Figure 14:
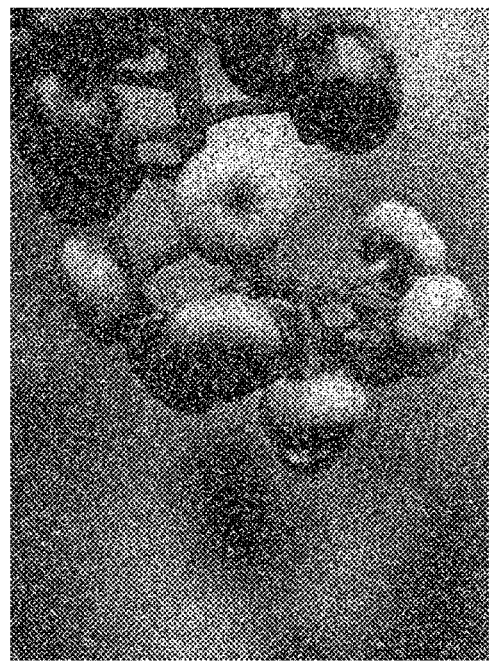
Figure 14:
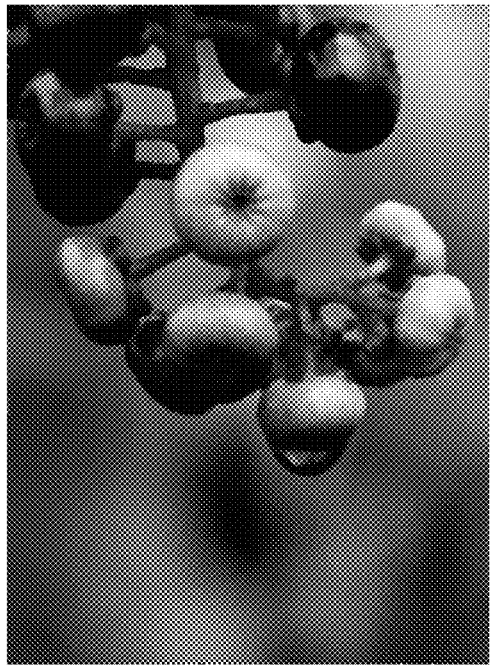

FIGS. 13 and 14 show image denoising results and tuning parameters for some real images with salt-and-pepper noise. The noisy images are shown in FIGS. 13(a) and 14(a), and include salt-and-pepper noise with a noise density 0.4. The restored images are shown in FIGS. 13(b) and 14(b). As we can observe, the embodiment recovers jump discontinuities and smooth regions better than total variation based image restoration which may suffer from the stair-case effect. The parameters used to produce FIGS. 13(a) and 14(b) are a=1, b=20, 77=10, $r_2$=700, $r_3$=100, $r_4$=500, and $\epsilon_r$=0.01.

TABLE 5

| Image | Size | SNR | Number of iterations | Time (seconds) |
|---|---|---|---|---|
| FIG. 13(b) | 400 × 420 | 20.87 | 239 | 113.147 |
| FIG. 14(b) | 512 × 700 | 20.32 | 174 | 182.359 |

In Table 5, we show the size of images, SNR, number of iterations and computational time for the test images in FIGS. 13 and 14. The number of iterations is the total number of outer iterations. The computational time is measured in seconds. From Tables 4 and 5, we can observe that the computational cost depends on the size of image and the number of outer iterations. In our numerical experiments, the condition (3.15) with $\epsilon_n=10^{-3}$ is satisfied mostly in less than 5 iterations (i.e. inner iterations) in an early stage of outer iteration k. As long as the outer iteration increases, one or two iterations are enough to solve the equation (3.14). This shows that the total computational cost depends on how many outer iterations are needed.

4.3 Image Zooming

Image zooming is one of basic operations in image processing, which changes a given image into a higher or lower resolution image. In this subsection, we only deal with image resolution enhancement by the factor r∈N More precisely, a given image $\bar{u}_c$, whose size is $[1, M_1] \times [1, M_2]$ is interpolated onto the domain $\Omega=[1,r(M_1-1)+1] \times [1,r(M_2-1)+1]$ and we define the set of points $\Gamma=\{(i,j)\in\Omega | i=1 \mod r, j=1 \mod r\}$. We use the image $u_0$, whose value is same as $\bar{u}_0$ on $\Gamma$, for the energy functional given in (2.1):

$$u_0(i,j) = \begin{cases} \bar{u}_0\left(\frac{i-1}{r}+1, \frac{j-1}{r}+1\right) & \text{if } (i,j) \in \Gamma, \\ 0 & \text{if } (i,j) \in \Omega \backslash \Gamma. \end{cases}$$

The image values on $\Omega \backslash \Gamma$ are interpolated via Euler's elastica energy. More suitable fidelity based on a down-sampling operator in [56] may give better quality. In the energy functional (2.1), s=1 is used for image zooming.

Figure 15:
Figure 15:
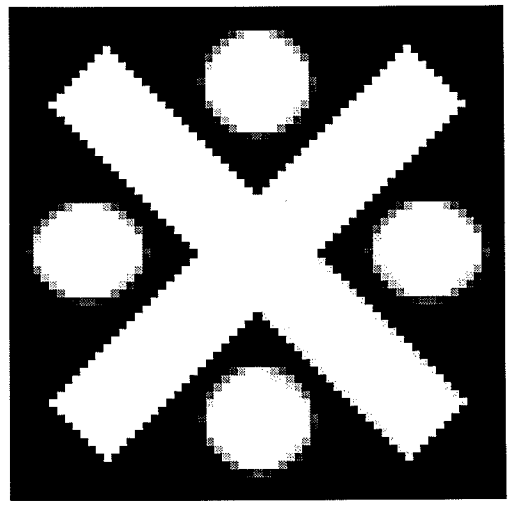
Figure 15:
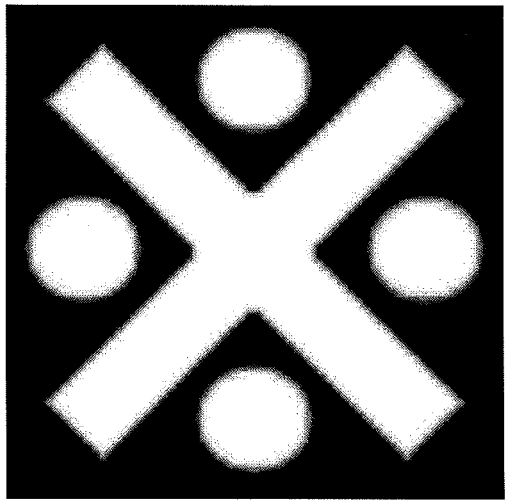
Figure 15:
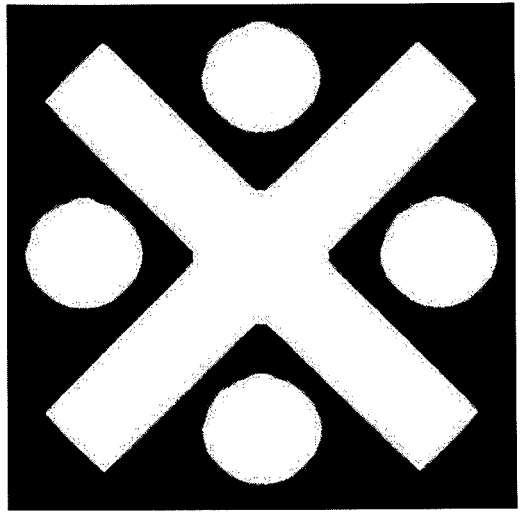

In FIG. 15, we show the results of magnifying a synthetic image by a factor 8. The size of input image in FIG. 15(a) is 64 by 64, and the enlarged images in FIG. 15(b)-(d) are 504 by 504. The images in FIGS. 15(b) and FIG. 15(c) are produced by box and bicubic filters respectively. FIG. 15(d) shows the result by minimizing the Euler's elastica energy using the embodiment. The computational time is 461.964 seconds and the total number of outer iterations is 691. The parameters used were a=1, b=10, η=100, $r_1$=1, $r_2$=500, $r_3$=100, $r_4$=500, and $\epsilon_r$=0.0003.

From this test, the advantage of the proposed algorithm is clear. It is very fast for an algorithm of this quality (previous algorithms of this level of quality took hours, not minutes). The discontinuity in the recovered image by Euler's elastica energy is very sharp. Corners and shapes are preserved. There is no blurring. The zig-zag boundary from the box filter and the blurring from the cubic filter are avoided. More tests of the proposed method for image zooming will be reported elsewhere.

REFERENCES

The disclosure in the following references is hereby incorporated by reference in its entirety:

[1] M. Malcolm. On the computation of nonlinear spline curves. SIAM J. Numer. Anai., 14:254-282, 1977.

[2] B. Horn. The curve of least energy. ACM Transactions on Math. Software, 9:441-460, 1983.

[3] M. Kallay. Plane curves of minimal energy. ACM Transactions on Math. Software, 12:219-222, 1986.

[4] M. Kallay. Method to approximate the space curve of least energy and prescribed length. Computer-Aided Design, 19:73-76, 1987.

[5] A. Bruckstein, R. Holt, and A. Netravali. Discrete elastica. Appl. Anal., 78:453-485, 2001.

[6] A. Bruckstein, A. Netravali, and T. Richardson. Epi-convergence of discrete elastica. Appi. Anai., 79:137-171, 2001.

[7] M. Nitzberg, D. Mumford, and T. Shiota. Filtering, Segmentation and Depth, volume 662. Springer-Verlag, Berlin, 1993.

[8] S. Masnou and J.-M. Morel. Level lines based disocclusion. In Proc. IEEE Int. Conf. on Image Processing, Chicago, Ill., pages 259-263, 1998.

[9] L. Ambrosio and S. Masnou. On a variational problem arising in image reconstruction, volume 147. Birkhauser, Basel, 2004.

[10] T. F. Chan, S.-H. Kang, and J. Shen. Euler's elastica and curvature based inpaintings. SIAM J. Appi. Math., 63(2): 564-594, 2002.

[11] C. Ballester, M. Bertalmio, V. Caselles, G. Sapiro, and J. Verdera. Filling-in by joint interpolation of vector fields and gray levels. IEEE Trans. Image Processing, 10(8): 1200-1211, 2001.

[12] L. I. Rudin, S. Osher, and E. Fatemi. Nonlinear total variation based noise removal algorithms. Physica D, 60:259-268, 1992.

[13] A. Chambolle. An algorithm for total variational minimization and applications. J. Math. Imaging Vis., 20:89-97, 2004.

[14] T. F. Chan, G. H. Golub, and P. Mulet. A nonlinear primal-dual method for total variation-based image restoration. SIAM J. Sci. Comput., 20:1964-1977, 1999.

[15] W. T. Yin, S. Osher, D. Goldfarb, and F. Darbon. Bregman iterative algorithms for compressed sensing and related problems. SIAM J. Img. Sci., 1:143-168, 2008.

[16] P. Weiss, L. Blanc-F'eraud, and G. Aubert. Efficient schemes for total variation minimizatio under constraints in image processing. SIAM J. Sci. Comp., 31:2047-2080, 2009.

[17] M. Zhu and T. Chan. An efficient primal-dual hybrid gradient algorithm for total variation image restoration. Technical report, UCLA CAM Report 08-34, 2008.

[18] X. Zhang, M. Burger, and S. Osher. A unified primal-dual algorithm framework based on Bregman iteration. Technical report, UCLA CAM Report 09-99, 2009.

[19] E. Esser. Applications of lagrangian-based alternating direction methods and connections to split Bregman. Technical report, UCLA CAM Report 09-31, 2009.

[20] E. Esser, X. Zhang, and T. Chan. A general framework for a class of first order primal-dual algorithms for TV minimization. Technical report, UCLA CAM Report 09-67, 2009.

[21] S. Setzer. Splitting Bregman algorithm, Douglas-Rachford splitting and frame shrinkage. In SSVM '09: Proceedings of the Second International Conference on Scale Space and Variational Methods in Computer Vision, pages 464-476, Berlin, Heidelberg, 2009. Springer-Verlag.

[22] G. Steidl and T. Teuber. Removing multiplicative noise by Douglas-Rachford splitting methods. J. Math. Imaging Vision, 36:168-184, 2010.

[23] X.-C. Tai and C. Wu. Augmented Lagrangian method, dual methods and split Bregman iteration for ROF model. In SSVM '09: Proceedings of the Second International Conference on Scale Space and Variational Methods in Computer Vision, pages 502-513, Berlin, Heidelberg, 2009. Springer-Verlag.

[24] C. Wu and X.-C. Tai. Augmented Lagrangian method, dual methods, and split Bregman iteration for ROF, vectorial TV, and high order models. Technical report, UCLA CAM Report 09-76, 2009.

[25] C. Wu, J. Zhang, and X.-C. Tai. Augmented Lagrangian method for total variation restoration with non-quadratic fidelity. Technical report, UCLA CAM Report 09-82, 2009.

[26] Y. Yang, Y. Zhang, and W. Yin. An efficient TVL1 algorithm for deblurring multichannel images corrupted by impulsive noise. SIAM J. Sci. Comput., 31:2842-2865, 2009.

[27] P. L. Lions and B. Mercier. Splitting algorithms for the sum of two nonlinear operators. SIAM J. Num. Anai., 16:964-979, 1979.

[28] T. Lu, P. Neittaanmaki, and X.-C. Tai. A parallel splitting up method for partial differential equations and its application to Navier-Stokes equations. RAIRO Math. Modei. and Numer. Anai., 26(6):673-708, 1992.

[29] J. Weickert, B. M. ter Han Romeny, and M. A. Viergever. Efficient and reliable schemes for nonlinear diffusion filtering. IEEE Trans. Image Process., 7:398-410, 2001.

[30] J. Hahn, C. Wu, and X.-C. Tai. Augmented Lagrangian method for generalized TV-Stokes model. Technical report, UCLA CAM Report, 2010.

[31] M. Bertalmio, G. Sapiro, V. Caselles, and C. Ballester. Image inpainting. In Computer Graphics, SIGGRAPH 2000, pages 417-424, 2000.

[32] V. Caselles, J. M. Morel, and S. Catalina. Axiomatic approach to image interpolation. IEEE Trans. Image Process., 7(3):376-386, 1998.

[33] S. Masnou and J. M. Morel. Disocclusion: A variational approach using level lines. IEEE Trans. Image Process., 11(2):68-76, 2002.

[34] L. Ambrosio and S. Masnou. A direct variational approach to a problem arising in image reconstruction. Interfaces Free Bound., 5(1):63-81, 2003.

[35] S. Masnou and J.-M. Morel. On a variational theory of image amodal completion. Rend. Sem. Mat. Univ. Padova, 116:211-252, 2006.

[36] T. F. Chan and J. Shen. Nontexture inpainting by curvature driven diffusion (CDD). J. Visual Comm. Image Rep., 12:436-449, 2001.

[37] T. F. Chan and J. Shen. Mathematical models for local nontexture inpaintings. SIAM J. Appl. Math, 62(3):1019-1043, 2002.

[38] T. F. Chan and J. Shen. Variational image inpainting. Comm. Pure Applied Math., 58:579-619, 2005.

[39] S. Esedoglu and J. Shen. Digital inpainting based on the Mumford-Shah-Euler image model. European J. Appi. Math., 13(4):353-370, 2002.

[40] C. Ballester, V. Caselles, and J. Verdera. Disocclusion by joint interpolation of vector fields and gray levels. Multiscale Model. Simul., 2(1):80-123, 2003.

[41] M. Bertalmio, L. Vese, G. Sapiro, and S. Osher. Simultaneous structure and texture image inpainting. IEEE TIP, 12(8):882-889, 2003.

[42] T. Chan, J. Shen, and H. M. Zhou. Total variation wavelet inpainting. J. Math. Imaging Vision, 25:107-125, 2006.

[43] J. Cai, R. Chan, and Z. Shen. A framelet-based image inpainting algorithm. Appl. Comput. Harmon. Anal., 24(2):131-149, 2008.

[44] A. Efros and T. Leung. Texture synthesis by non-parametric sampling. In IEEE International Conference on Computer Vision, Corfu, Greece, pages 1033-1038, 1999.

[45] W. Freeman, E. Pasztor, and O. Carmichael. Learning low-level vision. Int. J. Comput. Vis, 40:25-47, 2000.

[46] L. Y. Wei, M. Levoy, H. Bischof, and A. Chambolle. Fast texture synthesis using tree-structured vector quantization. In ACM Trans. On Graphics (SIGGRAPH00), pages 479-488, 2000.

[47] A. Criminisi, P. Perez, and K. Toyama. Object removal by exemplar-based inpainting. In IEEE Int. Conf. Comp. Vision and Pattern Recog., pages 721-728, 2003.

[48] F. Cao, Y. Gousseau, S. Masnou, and P. Pérez. Geometrically guided exemplar-based inpainting. (submitted)

[49] J. F. Aujol, S. Ladjal, and S. Masnou. Exemplar-based inpainting from a variational point of view. SIAM J. Math. Anai., (To appear)

[50] T. Schoenemann, F. Kahl, and D. Cremers. Curvature regularity for region-based image segmentation and inpainting: A linear programming relaxation. In IEEE Int. Conf. Comp. Vision, Kyoto, Japan, 2009.

[51] N. El-Zehiry and L. Grady. Fast global optimization of curvature. In IEEE conference on CVPR 2010, San Francisco, Calif., USA, pages 3257-3264.

[52] E. Bae, J. Shi, and X.-C. Tai. Graph cuts for curvature based image. IEEE Trans. Image Process. (To appear).

[53] T. Pock, D. Cremers, H. Bischof, and A. Chambolle. An algorithm for minimizing the Mumford-Shah functional. In IEEE Internationai Conference on Computer Vision (ICCV) Kyoto, Japan, 2009.

[54] M. Lysaker and X.-C. Tai. Iterative image restoration combining total variation minimization and a second-order functional. Int. J. Comput. Vis., 66:5-18, 2006.

[55] W. Zhu and T. Chan. Image denoising using mean curvature Available in: http://www.cims.nyu.edu/wzhu/meancurvature06Nov30.pdf. 2009.

[56] A. Marquina and S. Osher. Image super-resolution by TV-regularization and Bregman iteration. J. Sci. Comput., 37:367-382, 2008

The invention claimed is:

1. A computer-implemented method for using a degraded first image to generate a second image, the second image being a stationary point of an Euler's elastica energy defined using the first and second images, the method comprising finding a stationary point of an augmented Lagrangian function, obtained from the Euler's elastica energy using a plurality of supplementary variables and Lagrange multipliers; wherein the Euler's elastica energy is of the form:

$$\int_\Omega \left(a + b\left(\nabla \cdot \frac{\nabla u}{|\nabla u|}\right)^2\right)|\nabla u| + \frac{\eta}{s}\int_\Gamma |u - u_0|^s,$$

where:
(i) a, b and η are parameters which are greater than zero, and s is a parameter which is greater than or equal to 1;
(ii) the first image is a set of values $u_0$ defined at a set of respective points Γ, and the second image is a set of values u defined at a set of respective points Ω, where the set of points Ω comprises the set of points Γ; and
(iii)

$$\int_\Omega \text{ and } \int_\Gamma$$

denote respectively the integrals over the sets of points Ω and Γ.

2. A method according to claim 1 in which the sets of points Ω and Γ are the same.

3. A method according to claim 1 in which the set of points Ω consists of the set of points Γ and one of more contiguous inpainting domains D, each inpainting domain comprising multiple points.

4. A method according to claim 1 in which the set of points Γ is a subset of the sets of points Ω selected according to a regular periodicity.

5. A method according to claim 1 in which the augmented Lagrangian function is $$\mathcal{L}(v, u, m, p, n; \lambda_1, \lambda_2, \lambda_3, \lambda_4) =$$

$$\int_\Omega (a + b(\nabla \cdot n)^2)|p| + \frac{\eta}{s}\int_\Gamma |v - u_0|^s + r_1 \int_\Omega (|p| - m \cdot p) +$$

$$\int_\Omega \lambda_1(|p| - m \cdot p) + \frac{r_2}{2}\int_\Omega |p - \nabla u|^2 + \int_\Omega \lambda_2 \cdot (p - \nabla u) +$$

$$\frac{r_3}{2}\int_\Omega (v - u)^2 + \int_\Omega \lambda_3(v - u) + \frac{r_4}{2}\int_\Omega |n - m|^2 + \int_\Omega \lambda_4 \cdot (n - m) + \delta_R(m)$$

where v, m, p and n are supplementary variables, $r_1, r_2, r_3$, and $r_4$ are positive penalty parameters and $\lambda_1 \lambda_2, \lambda_3$, and $\lambda_4$ are Lagrange multipliers.

6. A method according to claim 1 in which the first and second images are two-dimensional images, the second image being defined at points on a two dimensional grid, at least one of the supplementary variables and at least one of the Lagrange multipliers being defined at points of at least one second two-dimensional grid, the two-dimensional grids having points corresponding to and off-set from points of the first two-dimensional grid.

7. A computer-implemented method for using a degraded first image to generate a second image, the second image being a stationary point of an Euler's elastica energy defined using the first and second images, the method comprising finding a stationary point of an augmented Lagrangian function, obtained from the Euler's elastica energy using a plurality of supplementary variables and Lagrange multipliers said step of finding the stationary point being performed in one or more iterations, and each iteration comprising:
(i) an iterative process of minimizing the augmented Lagrangian function with respect to the second image and the supplementary variables, using constant values for the Lagrange multipliers; and
(ii) updating the Lagrange multipliers, using values for the second image and supplementary variables obtained in step (i).

8. A method according to claim 7 in which the iterative process is performed, in each iteration, successively for the second image and the supplementary variables, by arithmetic calculation or by solution of linear equations.

9. A method according to claim 7 in which the first and second images are two-dimensional images, the second image being defined at points on a two dimensional grid, at least one of the supplementary variables and at least one of the Lagrange multipliers being defined at points of at least one second two-dimensional grid, the two-dimensional grids having points corresponding to and off-set from points of the first two-dimensional grid.

10. A computer system for using a first image to generate a second image, the computer system comprising a processor and a memory device, the memory device storing program instructions operative, upon being performed by the processor, to cause the processor to generate a second image which is a stationary point of an Euler's elastica energy defined using the first and second images, by using an augmented Lagrangian function, comprising a plurality of supplementary variables and Lagrange multipliers;

wherein the Euler's elastica energy is of the form:

$$\int_\Omega \left(a + b\left(\nabla \cdot \frac{\nabla u}{|\nabla u|}\right)^2\right)|\nabla u| + \frac{\eta}{s}\int_\Gamma |u - u_0|^s,$$

where:
(i) a, b and η are parameters which are greater than zero, and s is a parameter which is greater than or equal to 1;
(ii) the first image is a set of values $u_0$ defined at a set of respective points Γ, and the second image is a set of values u defined at a set of respective points Ω, where the set of points Ω comprises the set of points Γ; and
(iii)

$$\int_\Omega \text{ and } \int_\Gamma$$

denote respectively the integrals over the sets of points Ω and Γ.

11. A non-transitory computer recording medium storing computer program instructions operative, upon being performed by a processor, to cause the processor to generate from a first image a second image which is a stationary point of an Euler's elastica energy defined using the first and second images, by using an augmented Lagrangian function, comprising a plurality of supplementary variables and Lagrange multipliers, wherein the Euler's elastica energy is of the form:

$$\int_\Omega \left(a + b\left(\nabla \cdot \frac{\nabla u}{|\nabla u|}\right)^2\right)|\nabla u| + \frac{\eta}{s}\int_\Gamma |u - u_0|^s,$$

where:
(i) a, b and η are parameters which are greater than zero, and s is a parameter which is greater than or equal to 1;
(ii) the first image is a set of values $u_0$ defined at a set of respective points Γ, and the second image is a set of values u defined at a set of respective points Ω, where the set of points) Ω comprises the set of points Γ; and
(iii)

$$\int_\Omega \text{ and } \int_\Gamma$$

denote respectively the integrals over the sets of points Ω and Γ.

12. A computer system for using a first image to generate a second image, the computer system comprising a processor and a memory device,
the memory device storing program instructions operative, upon being performed by the processor, to cause the processor to generate a second image which is a stationary point of an Euler's elastica energy defined using the first and second images, by using an augmented Lagrangian function, comprising a plurality of supplementary variables and Lagrange multipliers;
said program instructions causing the processor to find said stationary point in one or more iterations, each iteration comprising:
(i) an iterative process of minimizing the augmented Lagrangian function with respect to the second image and the supplementary variables, using constant values for the Lagrange multipliers; and
(ii) updating the Lagrange multipliers, using values for the second image and supplementary variables obtained in step (i).

13. A non-transitory computer recording medium storing computer program instructions operative, upon being performed by a processor, to cause the processor to generate from a first image a second image which is a stationary point of an Euler's elastica energy defined using the first and second images, by using an augmented Lagrangian function, comprising a plurality of supplementary variables and Lagrange multipliers;
said computer program instructions causing the processor to find said stationary point in one or more iterations, each iteration comprising:
(i) an iterative process of minimizing the augmented Lagrangian function with respect to the second image and the supplementary variables, using constant values for the Lagrange multipliers; and
(ii) updating the Lagrange multipliers, using values for the second image and supplementary variables obtained in step (i).

* * * * *